United States Patent
Takase et al.

(10) Patent No.: US 10,873,284 B2
(45) Date of Patent: Dec. 22, 2020

(54) MOTOR CONTROL UNIT AND ELECTRIC POWER STEERING APPARATUS EQUIPPED WITH THE SAME

(71) Applicant: NSK Ltd., Tokyo (JP)

(72) Inventors: Hiroaki Takase, Tokyo (JP); Ryo Minaki, Tokyo (JP); Hideki Sawada, Tokyo (JP); Takayoshi Sugawara, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/613,831

(22) PCT Filed: Jun. 12, 2018

(86) PCT No.: PCT/JP2018/022338
§ 371 (c)(1),
(2) Date: Nov. 15, 2019

(87) PCT Pub. No.: WO2018/230542
PCT Pub. Date: Dec. 20, 2018

(65) Prior Publication Data
US 2020/0180682 A1    Jun. 11, 2020

(30) Foreign Application Priority Data

Jun. 16, 2017  (JP) ................................. 2017-118864
Mar. 12, 2018  (JP) ................................. 2018-044284

(51) Int. Cl.
*H02P 21/16*    (2016.01)
(52) U.S. Cl.
CPC .................................... *H02P 21/16* (2016.02)
(58) Field of Classification Search
CPC ... H02M 1/38; H02M 2001/385; H02P 27/05; H02P 27/06; H02P 21/08
See application file for complete search history.

(56) References Cited

U.S. PATENT DOCUMENTS

| 10,494,016 B2 * | 12/2019 | Takase | .................... H02M 1/38 |
| 2019/0375449 A1 * | 12/2019 | Takase | .................... H02M 1/38 |
| 2020/0130730 A1 * | 4/2020 | Takase | ................. B62D 5/0463 |

FOREIGN PATENT DOCUMENTS

| JP | 2007-110827 A | 4/2007 |
| JP | 2009-165279 A | 7/2009 |

(Continued)

OTHER PUBLICATIONS

International Search Report of PCT/JP2018/022338 dated Sep. 11, 2018 [PCT/ISA/210].

(Continued)

*Primary Examiner* — Bickey Dhakal
(74) *Attorney, Agent, or Firm* — Sughrue Mion, PLLC

(57) ABSTRACT

A vector-control type motor control unit that calculates dq-axes control assist command values, calculates dq-axes current command values from the dq-axes control assist command values, converts the dq-axes current command values into 3-phase duty command values, and drives and controls a 3-phase brushless motor by an inverter of a PWM control, wherein a dead time compensation of the inverter is performed by calculating 3-phase dead time reference compensation values based on a motor rotational angle which is phase-corrected by using the dq-axes current command values, calculating dead time compensation values by processing the 3-phase dead time reference compensation values by a gain and a sign, and adding the dead time compensation values to dq-axes voltage command values or 3-phase voltage command values.

9 Claims, 29 Drawing Sheets

(56) References Cited

FOREIGN PATENT DOCUMENTS

| | | |
|---|---|---|
| JP | 4681453 B2 | 5/2011 |
| JP | 2012-231615 A | 11/2012 |
| JP | 2015-171251 A | 9/2015 |
| WO | 2012/169311 A1 | 12/2012 |
| WO | 2017/033508 A1 | 3/2017 |

OTHER PUBLICATIONS

International Preliminary Report on Patentability of PCT/JP2018/022338 dated Jun. 11, 2019 [PCT/IPEA/409].

\* cited by examiner

PRIOR ART

PRIOR ART

PRIOR ART d-AXIS ANGLE-DEAD TIME COMPENSATION VALUE REFERENCE TABLE
(ELECTRIC ANGLE 0-359 [deg])

q-AXIS ANGLE-DEAD TIME COMPENSATION VALUE REFERENCE TABLE
(ELECTRIC ANGLE 0-359 [deg])

US 10,873,284 B2

MOTOR CONTROL UNIT AND ELECTRIC POWER STEERING APPARATUS EQUIPPED WITH THE SAME

CROSS REFERENCE TO RELATED APPLICATIONS

This application is a National Stage of International Application No. PCT/JP2018/022338, filed Jun. 12, 2018, claiming priorities to Japanese Patent Application No. 2017-118864, filed Jun. 16, 2017 and Japanese Patent Application No. 2018-044284, filed Mar. 12, 2018.

TECHNICAL FIELD

The present invention relates to a motor control unit that vector-controls a driving of a 3-phase brushless motor using a dq-axes rotational coordinate system, compensates a dead time of an inverter based on a function of a motor rotational angle (an electrical angle), a dq-axes angle-dead time compensation value reference table or a 3-phase angle-dead time compensation value reference table and enables to perform a smooth control with a lower steering sound, and the electric power steering apparatus equipped with the above motor control unit.

BACKGROUND ART

There exists an electric power steering apparatus (EPS) which provides a steering mechanism of a vehicle with a steering assist torque (an assist torque) by means of a rotational torque of a motor, an electric vehicle, a machine tool and the like as an apparatus equipped with a motor control unit. The electric power steering apparatus applies a driving force of the motor as an actuator to a steering shaft or a rack shaft by means of a transmission mechanism such as gears or a belt through a reduction mechanism. In order to accurately generate the steering assist torque, such a conventional electric power steering apparatus performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through reduction gears 3, universal joints 4a and 4b, a pinion-and-rack mechanism 5, and tie rods 6a and 6b, further via hub units 7a and 7b. In addition, the steering shaft 2 is provided with a steering angle sensor 14 for detecting a steering angle θ and a torque sensor 10 for detecting a steering torque Th of the handle 1, and a motor 20 for assisting the steering torque of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) on the basis of the steering torque Th detected by the torque sensor 10 and a vehicle speed Vs detected by a vehicle speed sensor 12, and controls a current supplied to the motor by means of a voltage control command value Vref obtained by performing compensation or the like to the calculated current command value. A steering angle sensor 14 is not indispensable and may not be provided. It is possible to obtain the steering angle (a motor rotational angle) e from a rotational position sensor such as a resolver which is connected to the motor 20.

A controller area network (CAN) 40 to send/receive various information and signals on the vehicle is connected to the control unit 30, and it is also possible to receive the vehicle speed Vs from the CAN. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a central processing unit (CPU) (including a micro processor unit (MPU) and a micro controller unit (MCU)), and general functions performed by programs within the CPU are, for example, shown in FIG. 2.

Functions and operations of the control unit 30 will be described with reference to FIG. 2. The steering torque Th from the torque sensor 10 and the vehicle speed Vs from the vehicle speed sensor 12 are inputted into a steering assist command value calculating section 31. The steering assist command value calculating section 31 calculates a steering assist command value Iref1 based on the steering torque Th and the vehicle speed Vs using an assist map or the like. The calculated steering assist command value Iref1 is added with a compensation signal CM for improving characteristics from a compensating section 34 at an adding section 32A. The steering assist command value Iref2 after addition is limited of the maximum value thereof at a current limiting section 33. The current command value Irefm limited of the maximum value is inputted into a subtracting section 32B, whereat a detected motor current value Im is subtracted from the current command value Irefm.

A deviation $\Delta I$ (=Irefm−Im) which is the subtracted result at the subtracting section 32B is current-controlled such as a proportional-integral (PI) control at a PI-control section 35. The voltage control command value Vref obtained by the current control, and a modulation signal (a triangle wave carrier) CF are inputted into a PWM-control section 36, and a duty command value is calculated. The motor 20 is PWM-driven by an inverter 37 with a PWM signal calculated the duty command value. The motor current value Im of the motor 20 is detected by a motor current detector 38 and is inputted into the subtracting section 32B for the feed-back.

The compensating section 34 adds a self-aligning torque (SAT) detected or estimated and an inertia compensation value 342 at an adding section 344. The added result is further added with a convergence control value 341 at an adding section 345. The added result is inputted into the adding section 32A as the compensation signal CM and the control characteristics are improved.

Recently, a 3-phase brushless motor is mainly used as an actuator of the electric power steering apparatus and the like, and since the electric power steering apparatus is automotive products, the operating temperature range is wide. From a view point of a fail-safe, a dead time of the inverter to drive the motor needs greater than that for general industrial purposes that home appliances (industrial equipment<EPS). Generally, since a switching device (for example, a field-effect transistor (FET)) has a delay time when the operation is turned-OFF, a direct current (DC) link is shorted when the switching devices of an upper-arm and a lower-arm simultaneously switches a turned-OFF operation and a turned-ON operation. In order to prevent the above problem, a time (a dead time) that the operations of the switching devices of both arms are turned-OFF, is set.

As a result, a current waveform is distorted, and a responsibility of the current control and a steering feeling are badly affected. For example, when the driver slowly steers the handle in a situation that the handle is around a straight running state (an on-center state), a discontinuous steering feeling by means of the torque ripple and like is occurred. Because the back-EMF (electromotive force) of the motor in a middle speed steering or a high speed steering, and the interference voltage between the windings operate as the disturbance against the current control, the steering follow-up performance and the steering feeling in turn-back steering are badly affected.

A q-axis that is a coordinate axis of the rotor of the 3-phase brushless motor and controls the torque of a rotor of the 3-phase brushless motor, and a d-axis that controls strength of a magnetic field are independently set. Since the d-axis crosses at 90° against the q-axis, the vector control system that controls the vectors corresponding to the respective axis currents (a d-axis current command value and a q-axis current command value) is known.

FIG. 3 shows a configuration example of driving and controlling the 3-phase brushless motor 100 by using the vector control system. Steering assist command values (Iref2 (idref and iqref)) (control assist command values) of the two-axes (the dq-axes coordinate system) that are calculated based on the steering torque Th, the vehicle speed Vs and the like, are calculated. The d-axis current command value id* and the q-axis current command value iq* whose max values are limited are inputted into the subtracting sections 131d and 131q, respectively. The current deviations Δid* and Δiq* that are calculated at the subtracting sections 131d and 131q are inputted into the proportional-integral control sections (PI-control sections) 120d and 120q, respectively. The voltage command values vd and vq that are PI-controlled at the PI-control sections 120d and 120q are inputted into the subtracting section 141d and the adding section 141q, respectively. Command voltages Δvd and Δvq that are calculated at the subtracting section 141d and the adding section 141q are inputted into a dq-axes/3-phase alternating current (AC) converting section 150. The voltage command values Vu*, Vv* and Vw* that are converted into the three phases at the dq-axes/3-phase AC converting section 150 are inputted into the PWM-control section 160. The motor 100 is driven with PWM-signals UPWM, VPWM and WPWM based on the calculated 3-phase duty command values $Duty_u$, $Duty_v$ and $Duty_w$ via the inverter (inverter applying voltage VR) 161 constituted by a bridge configuration of an upper-arm and a lower-arm as shown in FIG. 4. The upper-arm comprises FETs Q1, Q3 and Q5 serving as switching devices and the lower-arm comprises FETs Q2, Q4 and Q6.

The 3-phase motor currents $i_u$, $i_v$ and $i_w$ of the motor 100 are detected at the current detector 162, and the detected 3-phase currents $i_u$, $i_v$ and $i_w$ are inputted into the 3-phase AC/dq-axes converting section 130. The 2-phase feed-back currents id and iq that are converted at the 3-phase AC/dq-axes converting section 130 are subtraction-inputted into the subtracting sections 131d and 131q, and a d-q decoupling control section 140. The rotational sensor or the like is attached to the motor 100, and the motor rotational angle θ and the motor rotational speed (the motor rotational velocity) ω are outputted from the angle detecting section 110 that processes a sensor signal. The motor rotational angle θ is inputted into the dq-axes/3-phase AC converting section 150 and the 3-phase AC/dq-axes converting section 130, and the motor rotational speed ω is inputted into the d-q decoupling control section 140. The 2-phase voltages vd1* and vq1* from the d-q decoupling control section 140 are inputted into the subtracting section 141d and the adding section 141q, respectively, and the command voltages $\Delta v_d$ and $\Delta v_q$ are calculated in the subtracting section 141d and the adding section 141q. The command voltages $\Delta v_d$ and $\Delta v_q$ are inputted into the dq-axes/3-phase AC converting section 150, and the motor 100 is driven via the PWM-control section 160 and the inverter 161.

The vector-control type electric power steering apparatus described above is an apparatus to assist the steering of the driver, and a sound and a vibration of the motor, a torque ripple and the like are transmitted to the driver as a force sense via the handle. The field-effect transistors (FETs) are generally used as the power devices to drive the inverter, and the current is applied to the motor. In a case that the 3-phase motor is used, FETs, which are connected in series for respective phases, of the upper-arm and the lower-arm are used as shown in FIG. 4. Although the FETs of the upper-arm and the lower-arm are alternatively turned-ON and turned-OFF, the FET does not simultaneously turn-ON and turn-OFF in accordance with a gate signal since the FET is not an ideal switching device. Therefore, a turn-ON time and a turn-OFF time are needed. Consequently, if an ON-command for the upper-arm FET and an OFF-command for the lower-arm FET are simultaneously inputted, there is a problem that the upper-arm FET and the lower-arm FET simultaneously turn-ON and the upper-arm and the lower-arm become short circuits. There is a difference between the turn-ON time and the turn-OFF time for the FET. Thus, when the command is inputted into the FETs at the same time, the FET immediately turns-ON in a case that the turn-ON time is short (for example, 100 [ns]) by inputting the ON-command to the upper-FET, and reversely, the FET does not immediately turn-OFF in a case that the turn-OFF time is long (for example, 400 [ns]) by inputting the OFF-command to the lower-FET. In this way, a state (for example, between 400 [ns]–100 [ns], ON-ON) that the upper-FET is "ON" and the lower FET is "ON", often momentarily occurs.

In this connection, in order that the upper-arm FET and the lower-arm FET do not simultaneously turn-ON, the ON-signal is usually given to the gate driving circuit with a predetermined period being a dead time. Since the dead time is nonlinear, the current waveform is distorted, the responsibility of the control is badly affected and the sound, the vibration and the torque ripple are generated. In a column type electric power steering apparatus, since an arrangement of the motor directly connected to a gear box which is connected by the handle and the column shaft made of steel is extremely near the driver in the mechanism, it is necessary to especially consider the sound, the vibration, the torque ripple and the like due to the motor in comparison with a downstream type electric power steering apparatus.

Conventionally, in a method to compensate the dead time of the inverter, there are methods to add the compensation value to the dead time by detecting a timing occurring the dead time and to compensate the dead time by a disturbance observer on the dq-axes in the current control.

The electric power steering apparatus to compensate the dead time of the inverter is disclosed in, for example, Japanese Patent No. 4681453 B2 (Patent Document 1) and Japanese Unexamined Patent Publication No. 2015-171251 A (Patent Document 2). In Patent Document 1, there is provided a dead band compensation circuit that generates a model current based on the current command values by inputting the current command values into a reference model circuit of the current control loop including the motor and the inverter, and compensates the influence of the dead time of the inverter based on the model current. Further, in Patent Document 2, there is provided a dead time compensating section to correct based on the dead time compensation value for the duty command value, and the dead time compensating section comprises a basic compensation value calculating section to calculate a basic compensation value being a basic value of the dead time compensation value based on the current command value and a filtering section to perform a filtering-process corresponding to a low pass filter (LPF) for the basic compensation value.

THE LIST OF PRIOR ART DOCUMENTS

Patent Documents

Patent Document 1: Japanese Patent No. 4681453 B2
Patent Document 2: Japanese Unexamined Patent Publication No. 2015-171251 A

SUMMARY OF THE INVENTION

Problems to be Solved by the Invention

The apparatus disclosed in Patent Document 1 is a system that estimates the compensation sign by using a calculation of the dead time compensation amount according to the q-axis current command value and the 3-phase current reference model. The output value of the compensation circuit is a changing value in proportion to the model current in a region being a predetermined fixed value or less, and is an addition value of the changing values in proportion to the model current and the fixed value in a region being the predetermined fixed value or more. In this way, the output value of the compensation circuit is outputted from the current command to the voltage command. However, the tuning operation for determining the hysteresis characteristic to output the predetermined fixed value is necessary.

Further, in the apparatus disclosed in Patent Document 2, when the dead time is determined, the dead time compensation is performed by using the q-axis current command value and the compensation value in which the q-axis current command value is LPF-processed. Thus, the delay occurs, and there is a problem that the dead time compensation value is not operated for the final voltage command to the motor.

The present invention has been developed in view of the above-described circumstances, and an object of the present invention is to provide the vector-control type motor control unit that compensates the dead time of the inverter without the tuning operation, improves the distortion of the current waveform and the responsibility of the current control, and suppresses the sound, the vibration and the torque ripple, and the electric power steering apparatus equipped with the motor control unit.

Means for Solving the Problems

The present invention relates to a vector-control type motor control unit that calculates dq-axes control assist command values, calculates dq-axes current command val-ues from the dq-axes control assist command values, converts the dq-axes current command values into 3-phase duty command values, and drives and controls a 3-phase brushless motor by an inverter of a pulse width modulation control, the above-described object of the present invention is achieved by that: wherein a dead time compensation of the inverter is performed by calculating 3-phase dead time reference compensation values based on a motor rotational angle which is phase-corrected by using the dq-axes current command values, calculating dq-axes dead time compensation values by processing the 3-phase dead time reference compensation values with a gain and a sign and performing 3-phase/dq-axes conversion to the processed 3-phase values, and adding the dq-axes dead time compensation values to dq-axes voltage command values obtained by processing the dq-axes current command values, or, wherein a dead time compensation of the inverter is performed by calculating 3-phase dead time reference compensation values based on a motor rotational angle which is phase-corrected by using the dq-axes current command values, calculating 3-phase dead time compensation values by processing the 3-phase dead time reference compensation values with a gain and a sign, and adding the 3-phase dead time compensation values to 3-phase voltage command values after performing dq-axes space vector modulation, or, comprising an axes current factor phase-correction calculating section to calculate a phase-correction rotational angle by phase-correcting a motor rotational angle using the dq-axes current command values, an angle-dead time compensation value functional section to calculate 3-phase dead time reference compensation values based on the phase-correction rotational angle, an inverter applying voltage sensitive-gain calculating section to calculate a voltage sensitive gain based on an inverter applying voltage, and a dead time compensation-value outputting section to output dq-axes dead time compensation values which are obtained by multiplying the 3-phase dead time reference compensation values by the voltage sensitive gain and performing 3-phase/dq-axes conversion to the multiplied results, wherein a dead time compensation of the inverter is performed by adding the dq-axes dead time compensation values to dq-axes voltage command values obtained by processing the dq-axes current command values, or, comprising a space vector modulating section to obtain 3-phase voltage command values by performing a space vector modulation to the dq-axes current command values, an axes current factor phase-correction calculating section to calculate a phase-correction rotational angle by phase-correcting a motor rotational angle using the dq-axes current command values, an angle-dead time compensation value functional section to calculate 3-phase dead time reference compensation values based on the phase-correction rotational angle, an inverter applying voltage sensitive-gain calculating section to calculate a voltage sensitive gain based on an inverter applying voltage, a dead time compensation-value outputting section to output first 3-phase dead time compensation values obtained by multiplying the 3-phase dead time reference compensation values by the voltage sensitive gain, and a current command value sensitive-gain calculating section to calculate a current command value sensitive gain which makes a compensation amount of the first 3-phase dead time compensation values be variable depending on the control assist command values, wherein a dead time compensation of the inverter is performed by calculating second 3-phase dead time compensation values by multiplying the first 3-phase dead time compensation values by the current command value sensitive gain, and adding the second 3-phase dead time compensation values to the 3-phase voltage command values.

Further, the above-described object of the present invention is efficiently achieved by an electric power steering apparatus that is equipped with any one of the vector-control type motor control units, and applies an assist torque to a steering system of a vehicle.

Effects of the Invention

According to the motor control unit and the electric power steering apparatus of the present invention, the dead time of the inverter is compensated by calculating the dead time compensation values of the inverter based on the function of the motor rotational angle (the electrical angle), and adding (feed-forwarding) the dead time compensation values to the dq-axes voltage command values. Thereby, the motor control unit compensates the dead time of the inverter without the tuning operation, and improves the distortion of the current waveform and the responsibility of the current control. The motor control unit variably adjusts the magnitude and the direction of the dead time compensation values by using the control assist command value (the steering assist command value iqref) so as not to over-compensate the dead time compensation values.

Since the control is smoothly performed by using the dead time compensation based on the function of the motor rotational angle (the electrical angle), the sound and the vibration of the motor and the torque ripple can be suppressed. Since the compensation accuracy of the motor control unit of the present invention is high in the low speed and middle speed steering regions in which the motor angle is coincident with the phases of the 3-phase currents, the dead time of the inverter can be compensated even when the dq-axes compensation waveforms are not a rectangular wave.

BRIEF DESCRIPTION OF THE DRAWINGS

In the accompanying drawings.

MODE FOR CARRYING OUT THE INVENTION

Figure 1:
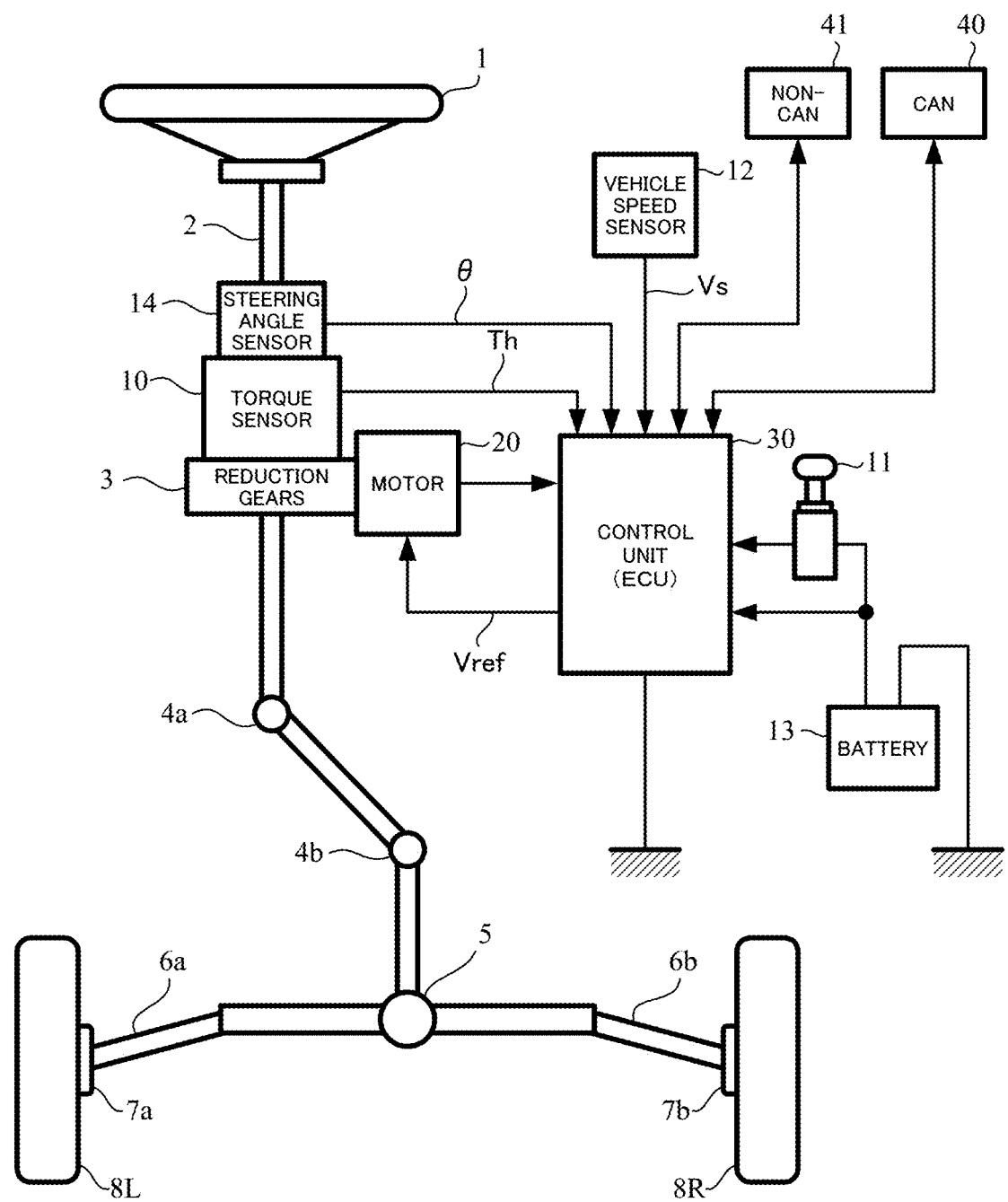
FIG. 1 is a configuration diagram showing a general outline of an electric power steering apparatus.

In order to resolve problems that a current distortion and a generation of torque ripple and a louder steering sound due to an influence of a dead time of an inverter in a control section such as an ECU occur, the present invention treats the dead time compensation values as a function of a motor rotational angle (an electrical angle), and performs a feed-forward compensation to dq-axes voltage command values, or performs the feed-forward compensation to 3-phase space-vector-modulated voltage command values. The dq-axes dead time compensation values or the 3-phase dead time compensation values are previously obtained by using the function depending on the motor rotational angle (the electrical angle) in offline. The dq-axes angle-dead time reference compensation value tables or the 3-phase angle-dead time reference compensation value tables are prepared based on the output waveforms of the above compensation values. The dead time compensation to the dq-axes voltage command values or the 3-phase voltage command values is performed by the feed-forward control using the dq-axes angle-dead time reference compensation value tables or the 3-phase angle-dead time reference compensation value tables.

Adjustment of an appropriate compensation amount of the dead time compensation value and estimation of a compensation direction can be performed by using the dq-axes control assist command values or the control assist command values at a 3-phase command section. The dead time compensation amount is appropriately adjusted by an inverter applying voltage. The dead time compensation values according to the motor rotational angle can be calculated on a real time, and the dead time compensation values depending on the motor rotational angle can be compensated on the dq-axes or on the 3-phase voltage command values.

In the low speed and middle speed control regions, there exists problems that a compensation deviation is occurred in amplitude of a particular phase current and the compensation deviation is occurred in the particular rotational speed in the motor control unit, and the steering sound is louder and the uncomfortable steering feeling is enhanced in the EPS, in the conventional 3-phase dead time compensation. To adjust the timing in the conventional 3-phase dead time compensation, it is necessary to consider the magnitudes of the rotational speed and the amplitude of the phase currents. The optimal adjustment that the both magnitudes are considered is difficult. In a case that the 3-phase compensation waveforms are not a rectangular wave in the conventional 3-phase dead time compensation, there exists a problem that the compensation cannot accurately be performed. In order to resolve such problems, the present invention that has a great effect in the low speed and middle speed control states (the low speed and middle speed steering states in the EPS), is proposed.

Embodiments of the present invention will be described with reference to the accompanying drawings as follows.

Figure 2:
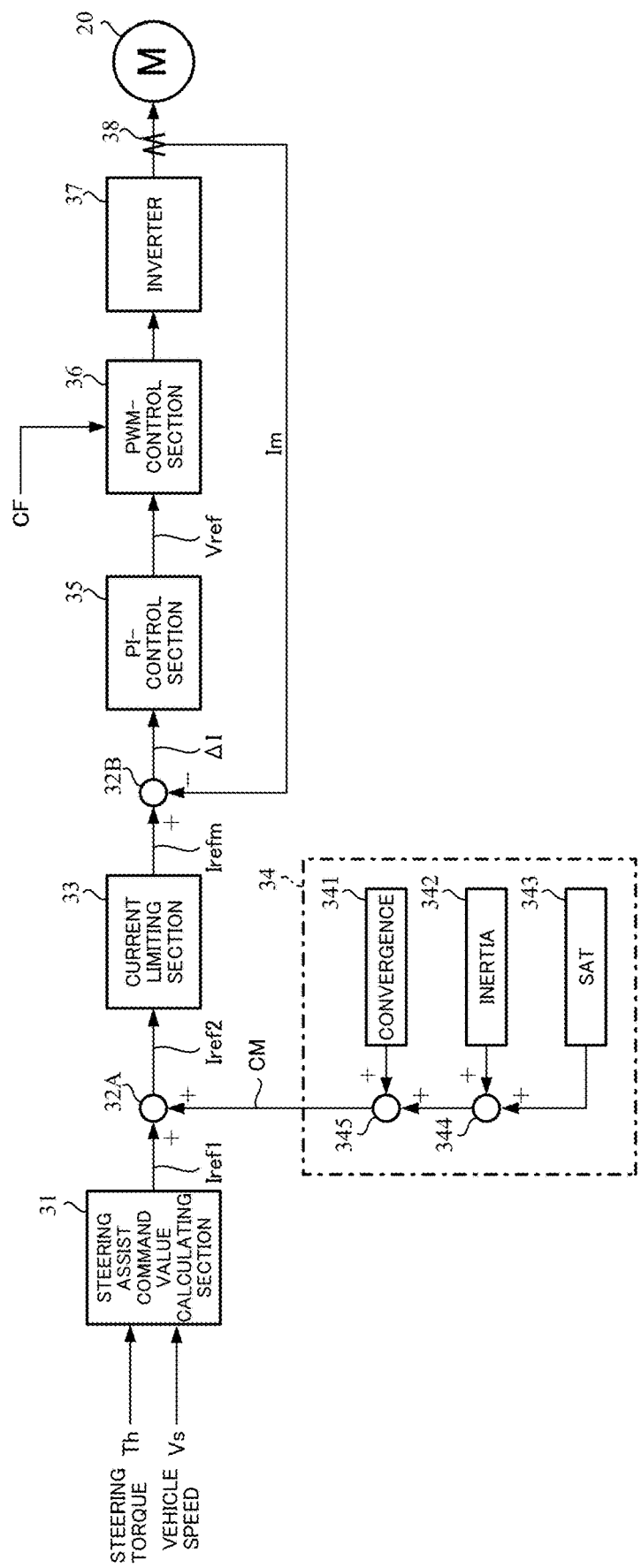
FIG. 2 is a block diagram showing a configuration example of a control system of the electric power steering apparatus.
Figure 3:
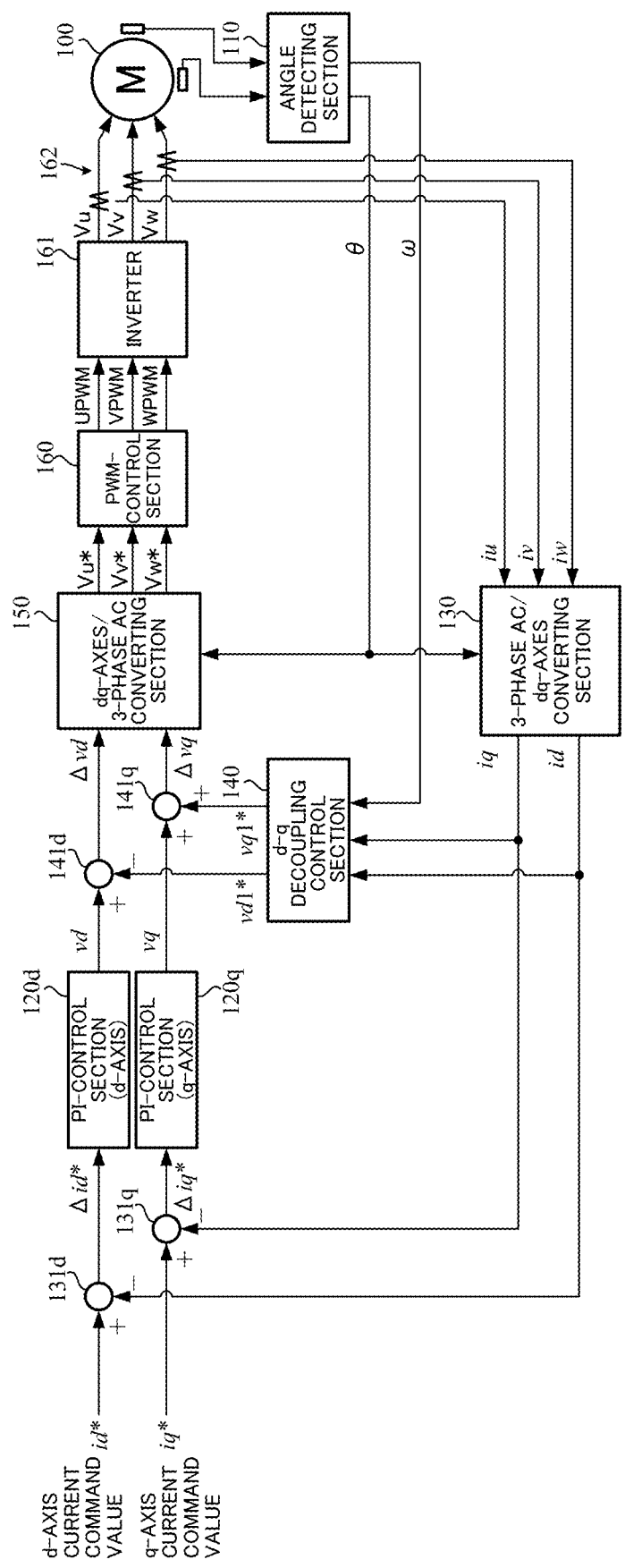
FIG. 3 is a block diagram showing a configuration example of a vector control system.
Figure 4:
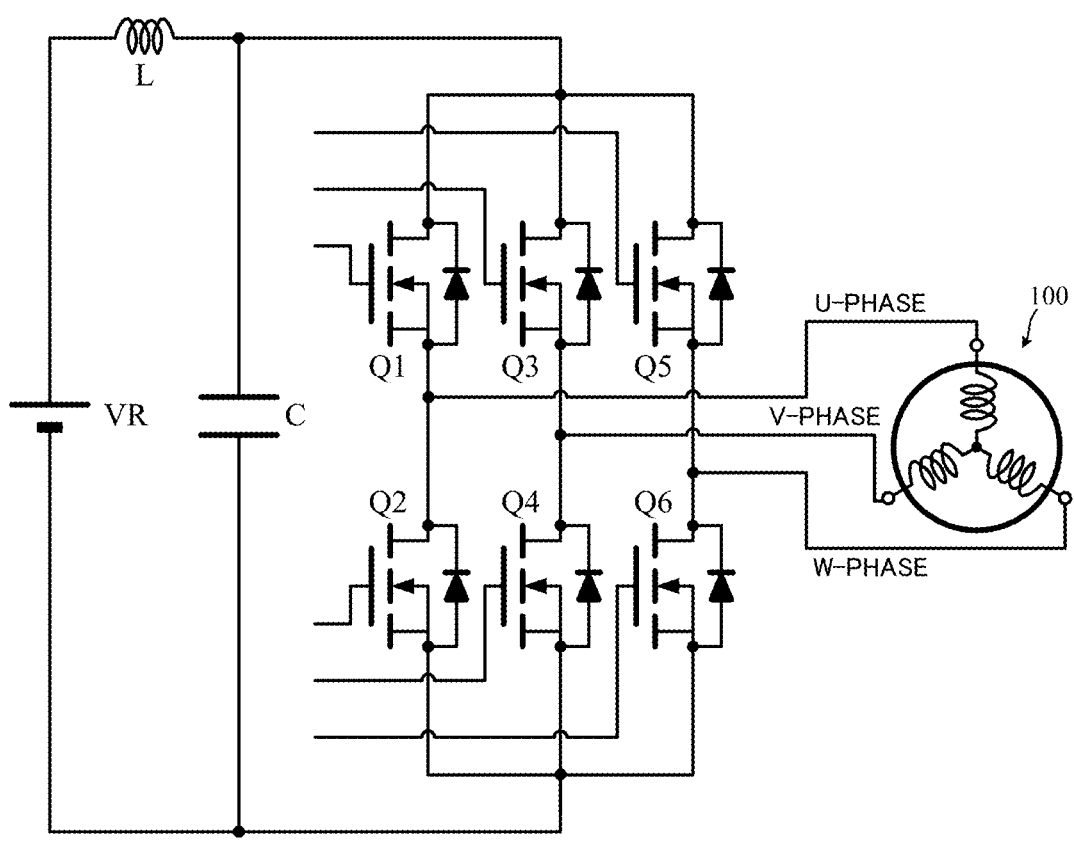
FIG. 4 is a wiring diagram showing a configuration example of a general inverter.
Figure 5:
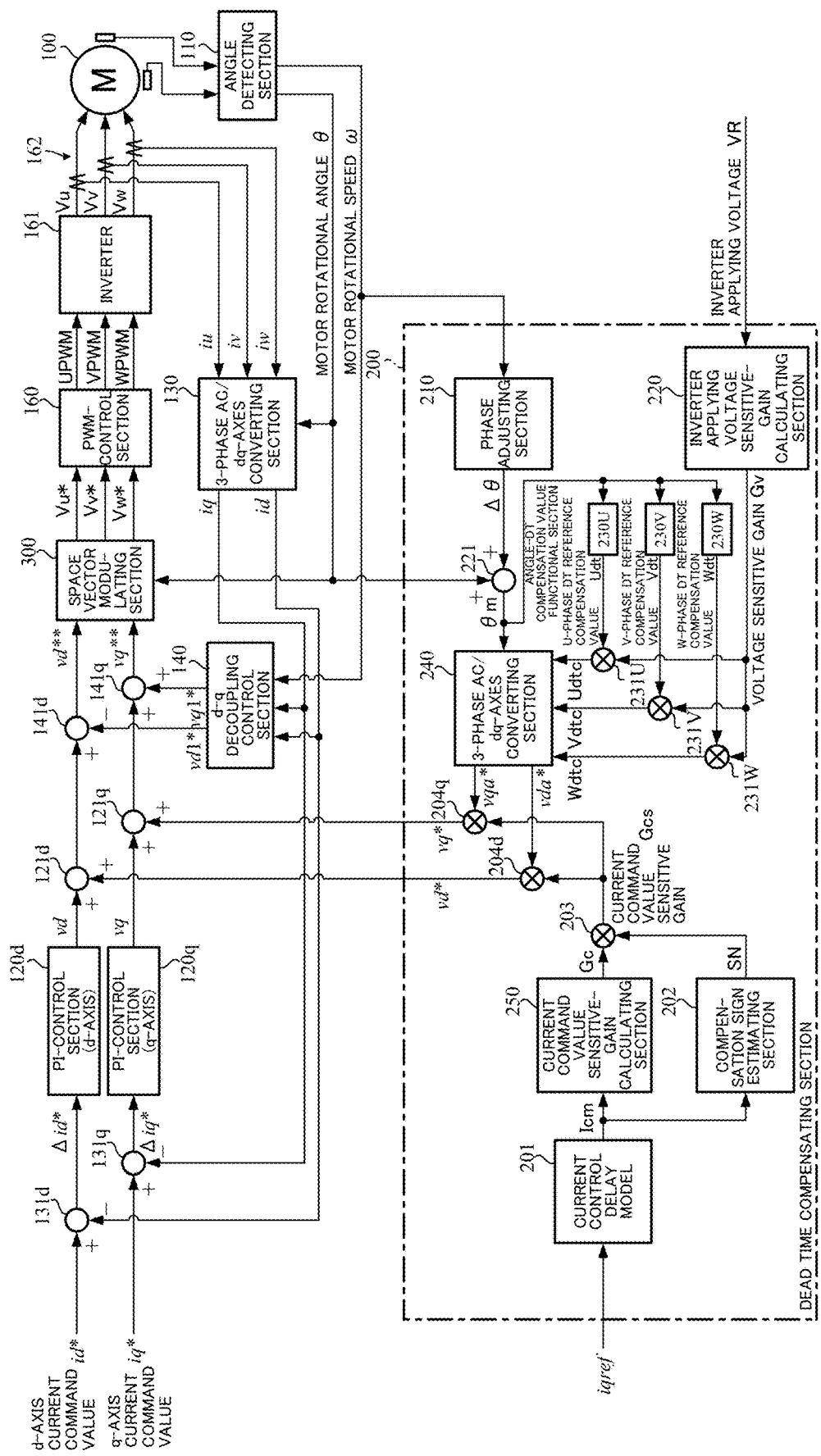
FIG. 5 is a block diagram showing a configuration example (the first embodiment) of the present invention.

FIG. 5 shows an overall configuration of the present invention (the first embodiment) corresponding to FIG. 3, and there is provided a dead time compensating section 200 to calculate the dq-axes dead time compensation values vd* and vq*. The q-axis steering assist command value (the q-axis control assist command value) iqref corresponding to the steering assist command value Iref2 in FIG. 2, a motor rotational angle θ and a motor rotational speed ω are inputted into the dead time compensating section 200. An inverter applying voltage VR applied to the inverter 161 is inputted into the dead time compensating section 200 and the PWM-signals (UPWM, VPWM and WPWM) from the PWM-control circuit (not shown) in the PWM-control section 160 are inputted into the inverter 161.

A d-axis current command value id* and a q-axis current command value iq* whose maximum values of the steering assist command values idref and iqref are limited are respectively inputted into subtracting sections 131d and 131q, and a current deviation Δid* between the d-axis current command value id* and the feed-back current id and a current deviation Δiq* between the q-axis current command value iq* and the feed-back current iq are respectively calculated at the subtracting sections 131d and 131q. The calculated current deviation Δid* is inputted into the PI-control section 120d, and the calculated current deviation Δiq* is inputted into the PI-control section 120q. The PI-controlled d-axis voltage command value vd and q-axis voltage command value vq are respectively inputted into adding sections 121d and 121q, and are compensated by respectively adding with the dead time compensation values vd* and vq* from the dead time compensating section 200 described below. The compensated voltage values are inputted into a subtracting section 141d and an adding section 141q, respectively. The voltage vd1* from the d-q decoupling control section 140 is inputted into the subtracting section 141d and a d-axis voltage command value vd** which is the difference is obtained at the subtracting section 141d. The voltage vq1* from the d-q decoupling control section 140 is inputted into the adding section 141q and a q-axis voltage command value vq which is the added result is obtained at the adding section 141q. The voltage command values vd and vq** whose dead time is compensated are converted from the 2-phase values on the dq-axes into the 3-phase values constituted by U-phase, V-phase and W-phase, and the converted 3-phase values are inputted into a space vector modulating section 300 in which the third-harmonic is superimposed. The 3-phase voltage command values Vu*, Vv* and Vw* which are vector-modulated at the space vector modulating section 300 are inputted into the PWM-control control section 160, and the motor 100 is driven and controlled via the PWM-control section 160 and the inverter 161 as described above.

Next, the dead time compensating section 200 will be described.

The dead time compensating section 200 comprises a current control delay model 201, a compensation sign estimating section 202, multiplying sections 203, 204d and 204q, an adding section 221, a phase adjusting section 210, an inverter applying voltage sensitive-gain calculating section 220, angle-dead time compensation value functional sections 230U, 230V and 230W, multiplying sections 231U, 231V and 231W, a 3-phase alternating current (AC)/dq-axes converting section 240 and a current command value sensitive-gain calculating section 250.

As well, a dead time compensation-value outputting section comprises the multiplying sections 231U, 231V and 231W and the 3-phase AC/dq-axes converting section 240. A current command value sensitive-gain calculating section comprises the current control delay model 201, the compensation sign estimating section 202, the current command value sensitive-gain calculating section 250 and the multiplying section 203.

Figure 6:
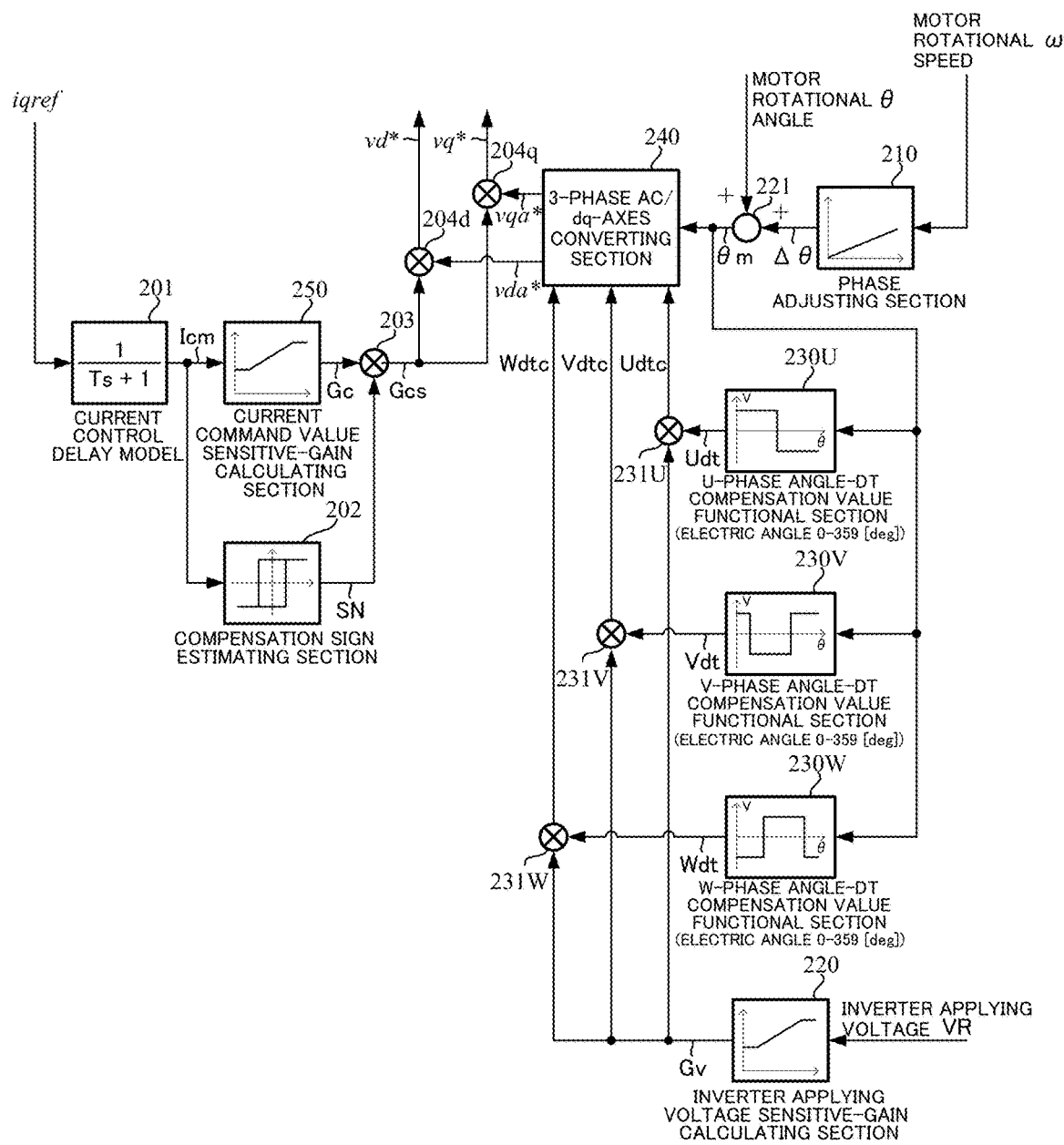
FIG. 6 is a block diagram showing the detail configuration example (the first embodiment) of the dead time compensating section according to the present invention.

The detail configuration of the dead time compensation 200 is shown in FIG. 6, and will be described with reference to FIG. 6.

The q-axis steering assist command value iqref is inputted into the current control delay model 201. A delay due to a noise filter or the like in the ECU is occurred until the dq-axes current command values id* and iq* are reflected in the actual currents. When the sign is directly judged from the current command value iq*, the timing deviation can be occurred. To resolve this problem, in the present embodiment, the delay of the overall current control is approximated as a primary filter model and the phase difference is improved. The current control delay model 201 of the present embodiment is a primary filter of the below Expression 1 and "T" denotes a filter time constant. The current control delay model 201 may be a model of a secondary filter or higher order filter.

$$\frac{1}{Ts+1}$$ [Expression 1]

The current command value $I_{cm}$ outputted from the current control delay model 201 is inputted into the current command value sensitive-gain calculating section 250 and the compensation sign estimating section 202. In a low current region, a case that the dead time compensation amount is overcompensated is occurred. The current command value sensitive-gain calculating section 250 has a function that a gain in which the compensation amount is reduced depending on the magnitude of the current command value $I_{cm}$ (the steering assist command value iqref) is calculated. In order that the gain in which the compensation amount is reduced is not largely changed due to a noise from the current command value $I_{cm}$ (the steering assist command value iqref), or the like, a noise reduction process is performed by using a weighted average filter.

Figure 7:
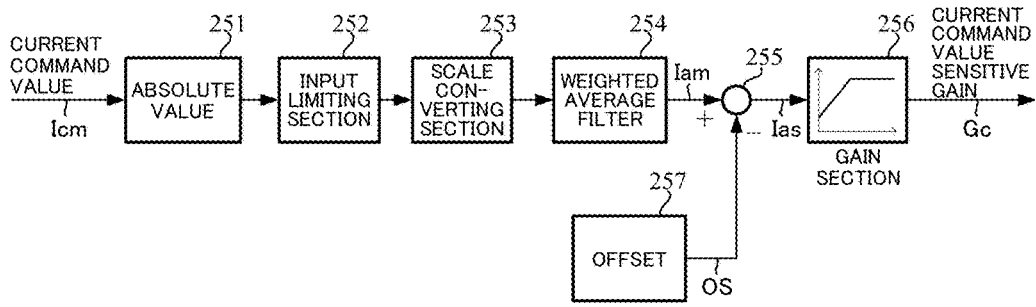
FIG. 7 is a block diagram showing a configuration example of a current command value sensitive-gain calculating section.
Figure 8:
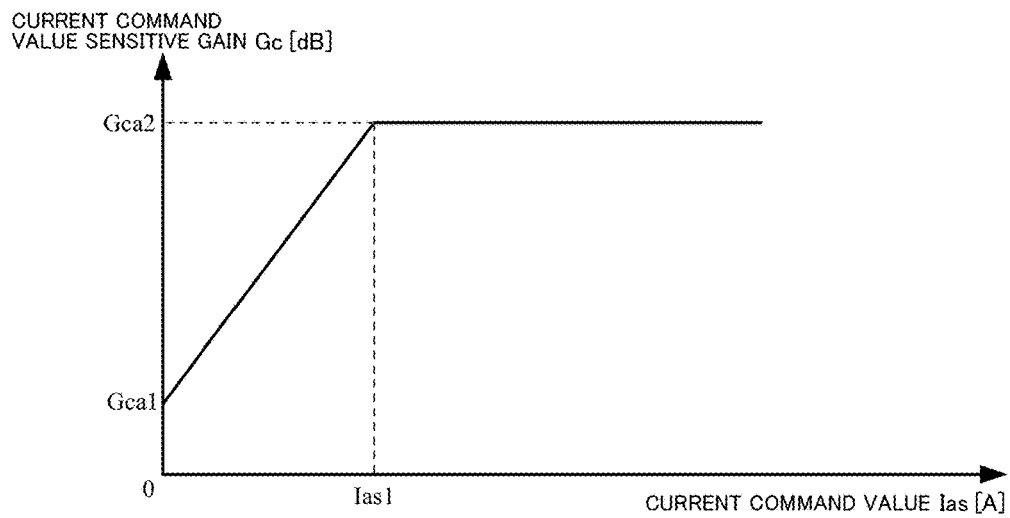
FIG. 8 is a characteristic diagram showing a characteristic example of a gain section in the current command value sensitive-gain calculating section.

The current command value sensitive-gain calculating section 250 has a configuration shown in FIG. 7. An absolute value of the current command value $I_{cm}$ is calculated at an absolute value section 251. The absolute value of the current command value $I_{cm}$ whose maximum value is limited at an input limiting section 252 is inputted into a weighted average filter 254 via a scale converting section 253. The current command value $I_{am}$ that the noise is reduced at the weighted average filter 254 is addition-inputted into a subtracting section 255, and a predetermined offset OS is subtracted from the current command value $I_{am}$ at the subtracting section 255. The reason for subtracting the offset OS is to prevent a chattering due to a minute current command value, and the input value that is equal to or smaller than the offset OS is fixed to the minimum gain. The offset OS is a constant value. The current command value $I_{as}$ that the offset OS is subtracted at the subtracting section 255 is inputted into a gain section 256, and the current command value sensitive gain $G_c$ is outputted in accordance with a gain characteristic as shown in FIG. 8.

Figure 9:
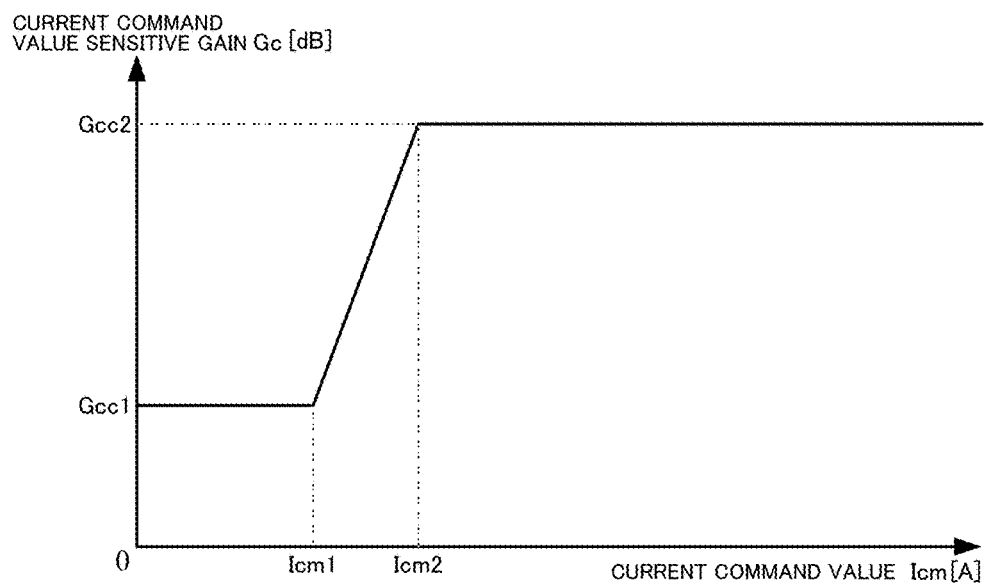
FIG. 9 is a characteristic diagram showing a characteristic example of the current command value sensitive-gain calculating section.

The current command value sensitive gain $G_c$ outputted from the current command value sensitive-gain calculating section 250 has a characteristic, for example, as shown in FIG. 9, for the inputted current command value $I_{cm}$. That is, the current command value sensitive gain $G_c$ is a constant gain $G_{cc1}$ when the current command value $I_{cm}$ is smaller than a predetermined current $I_{cm1}$, linearly (or nonlinearly) increases when the current command value $I_{cm}$ is equal to or larger than the predetermined current $I_{cm1}$ and is smaller than a predetermined current $I_{cm2}$ ($>I_{cm1}$), and holds a constant gain $G_{cc2}$ when the current command value $I_{cm}$ is equal to or larger than the predetermined current $I_{cm2}$. The predetermined current $I_{cm1}$ may be zero.

Figure 10A:
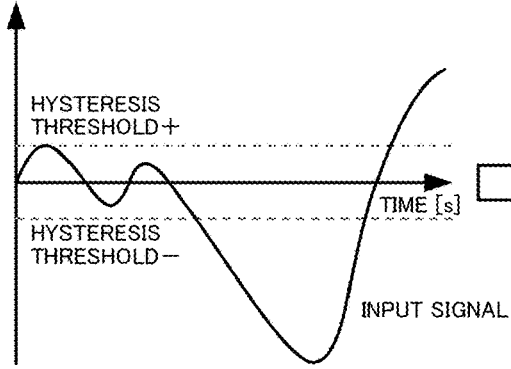
FIGS. 10A and 10B are waveform charts showing an operation example of a compensation sign estimating section.
Figure 10B:
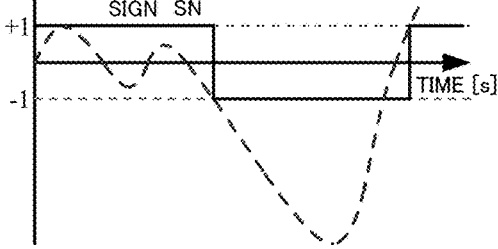

The compensation sign estimating section 202 outputs a compensation sign SN, which has a positive value (+1) or a negative value (−1) and indicates a hysteresis characteristic shown in FIGS. 10A and 10B, against the inputted current command value $I_{cm}$. The compensation sign SN is estimated based on zero-crossing points of the current command value $I_{cm}$ as a reference. In order to suppress the chattering, the compensation sign SN has the hysteresis characteristic. The estimated compensation sign SN is inputted into the multiplying section 203. The positive and negative thresholds of the hysteresis characteristic are appropriately changeable.

In a case that the sign of the dead time compensation value is simply determined from the current sign of the phase current command value model, the chattering is occurred in the low load. When the handle is slightly steered to the left or the right near the on-center, the torque ripple is occurred. In order to improve this problem, the hysteresis is adopted in the sign judgement. The current sign is held except for a case that the sign is changed beyond the set current value, and the chattering is suppressed.

The current command value sensitive gain $G_c$ from the current command value sensitive-gain calculating section 250 is inputted into the multiplying section 203. The multiplying section 203 outputs the current command value sensitive gain $G_{cs}$ (=$G_c$×SN) that the current command value sensitive gain $G_c$ is multiplied by the compensation sign SN. The current command value sensitive gain $G_{cs}$ is inputted into the multiplying sections 204d and 204q.

Figure 11:
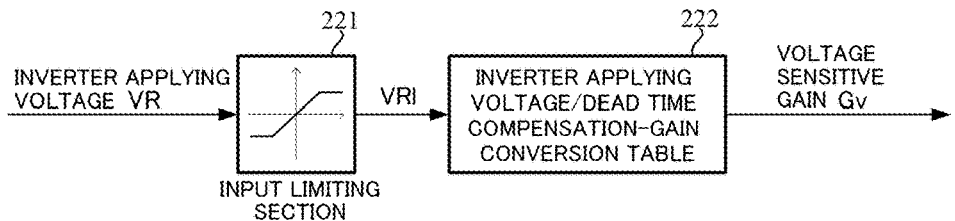
FIG. 11 is a block diagram showing a configuration example of an inverter applying voltage sensitive-gain calculating section.
Figure 12:
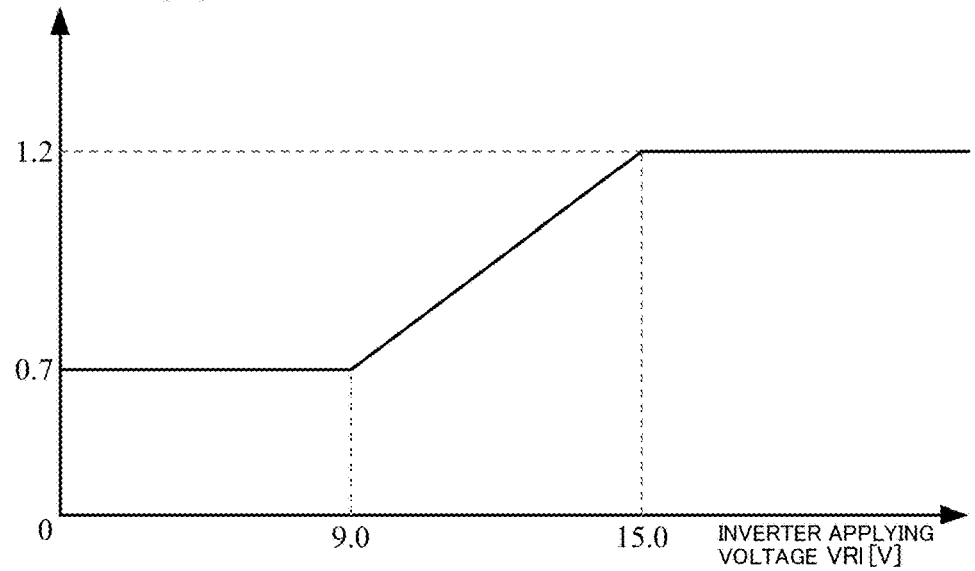
FIG. 12 is a characteristic diagram showing a characteristic example of the inverter applying voltage sensitive-gain calculating section.

Since the optimal dead time compensation amount varies depending on the inverter applying voltage VR, the voltage sensitive gain $G_v$ is calculated depending on the inverter applying voltage VR and then the dead time compensation amount is variable in the present embodiment. The configuration of the inverter applying voltage sensitive-gain calculating section 220 to output the voltage sensitive gain $G_v$ by inputting the inverter applying voltage VR is shown in FIG. 11. The maximum value of the inverter applying voltage VR is limited in an input limiting section 221 and the limited inverter applying voltage VRI is inputted into an inverter applying voltage/dead time compensation-gain conversion table 222. The characteristic of the inverter applying voltage/dead time compensation-gain conversion table 222 is shown, for example, in FIG. 12. The inverter applying voltages of inflection points 9.0 [V] and 15.0 [V] and the voltage sensitive gains "0.7" and "1.2" are presented as examples and are appropriately changeable. The calculated voltage sensitive gain $G_v$ is inputted into the multiplying sections 231U, 231V and 231W.

Figure 13:
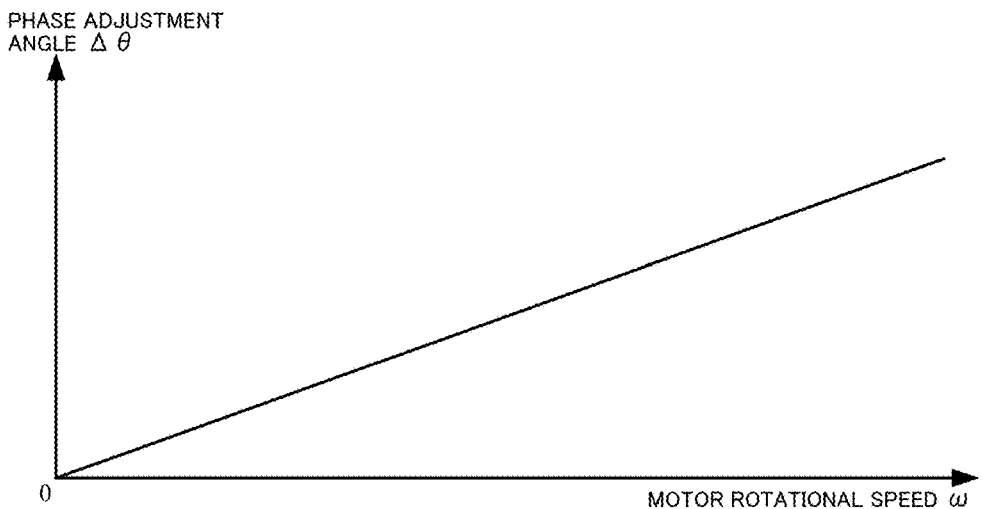
FIG. 13 is a characteristic diagram showing a characteristic example of a phase adjusting section.

Further, in a case that the dead time compensation timing is hastened or is delayed in response to the motor rotational speed ω, there is provided the phase adjusting section 210 which has a function to calculate the adjustment angle depending on the motor rotational speed ω in the present embodiment. The phase adjusting section 210 has a characteristic as shown in FIG. 13 in a case of a lead angle control. The calculated phase adjustment angle A is inputted into the adding section 221 and is added to the detected motor rotational angle θ. The motor rotational angle $θ_m$ (=θ+Δθ) that is an added result of the adding section 221 is inputted into the angle-dead time compensation value functional sections 230U, 230V and 230W and the 3-phase AC/dq-axes converting section 240.

After detecting a motor electric angle and calculating the duty command values, a time delay whose time is several tens of microseconds to one hundred microseconds is existed until actually correcting the PWM-signals. Since the motor is rotating during the delay time, a phase deviation between the motor electrical angle in calculation and the motor electrical angle at the correction timing of the PWM signals is generated. In order to compensate this phase deviation, the lead angle is performed depending on the motor rotational speed ω and the phase is adjusted.

Figure 14:
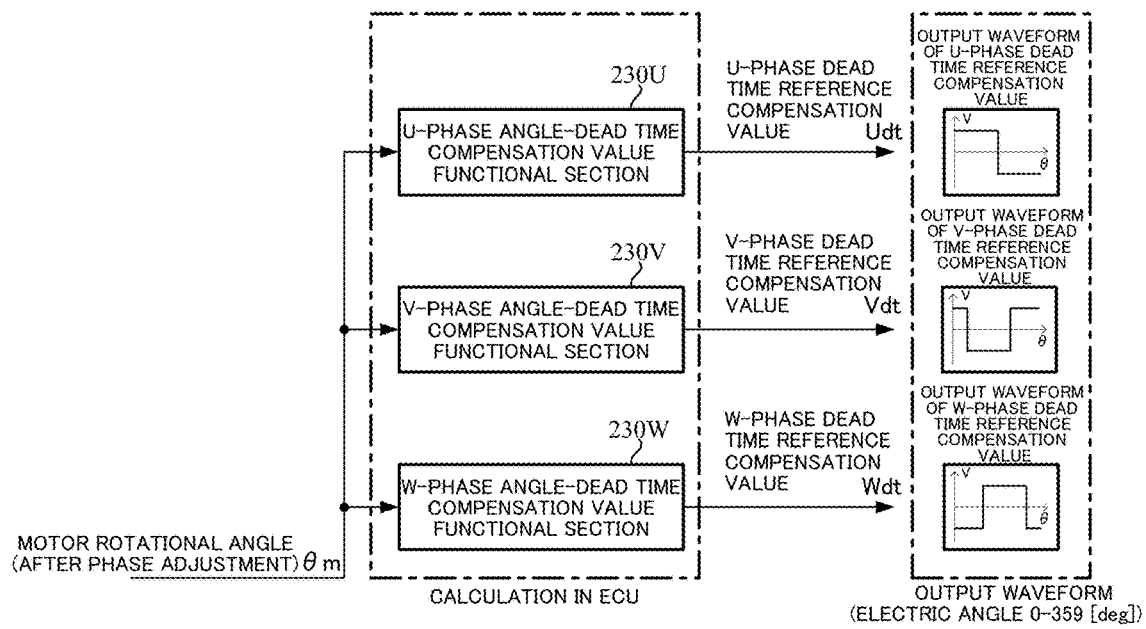
FIG. 14 is a diagram showing an operation example (the first embodiment) of an angle-dead time compensation value functional section.

The angle-dead time compensation value functional sections 230U, 230V and 230W, as shown in FIG. 14 in detail, respectively output respective phase rectangular wave dead time reference compensation values Udt, Vdt and Wdt whose phases are shifted each other by 120 [deg] in a range of 0 to 359 [deg] in the electrical angle, according to the phase-adjusted motor rotational angle $θ_m$. The angle-dead time compensation value functional sections 230U, 230V and 230W treat the dead time reference compensation values, which are needed in the three phases, as functions depending on the angle, calculate the dead time reference compensation values in the real time of the ECU, and output the 3-phase dead time reference compensation values Udt, Vdt and Wdt. The angle functions of the dead time reference compensation values are different depending on the characteristic of the dead time in the ECU.

The dead time reference compensation values Udt, Vdt and Wdt are respectively inputted into multiplying sections 231U, 231V and 231W, and are multiplied by the voltage sensitive gain $G_v$. The 3-phase dead time compensation values Udtc (=$G_v$·Udt), Vdtc (=$G_v$·Vdt) and Wdtc (=$G_v$·Wdt) which are multiplied by the voltage sensitive gain $G_v$ are inputted into the 3-phase AC/dq-axes converting section 240. The 3-phase AC/dq-axes converting section 240 converts the 3-phase dead time compensation values Udtc, Vdtc and Wdtc into the 2-phase dq-axes dead time compensation values vda* and vqa* in synchronized with the motor rotational angle $θ_m$. The dead time compensation values vda* and vqa* are respectively inputted into the multiplying sections 204d and 204q and are multiplied by the current command value sensitive gain $G_{cs}$. The multiplied results at the multiplying sections 204d and 204q are the dead time compensation values vd* and vq*, and the dead time compensation values vd* and vq* are respectively inputted into the adding sections 121d and 121q, are added to the voltage command values vd and vq and the added results are inputted into the space vector modulating section 300 as the voltage command values vd and vq via the subtracting section 141d and the adding section 141q.

In the first embodiment, the dead time compensation values are the 3-phase functions depending on the motor rotational angle (the electrical angle), the dq-axes dead time compensation values are obtained by performing the 3-phase/dq-axes conversion for the 3-phase dead time compensation values and the dq-axes voltage command values are compensated by the feed-forward control using the dq-axes dead time compensation values. The dq-axes steering assist command values are used in the compensation sign of the dead time. The compensation amount is variable so that the magnitude of the compensation amount is optimal depending on the magnitude of the steering assist command value iqref and the magnitude of the inverter applying voltage VR.

Next, the space vector modulation will be described.

Figure 15:
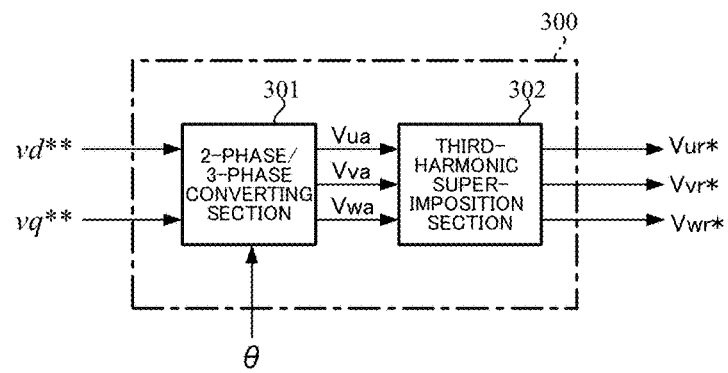
FIG. 15 is a block diagram showing a configuration example of a space vector modulating section.

As shown in FIG. 15, the space vector modulating section 300 may have a function that converts the 2-phase voltages vd and vq on the dq-axes space into the 3-phase voltages Vua, Vva and Vwa, and superimposes the third-harmonic on the 3-phase voltages Vua, Vva and Vwa. For example, the method of the space vector modulation that the applicant proposes in Japanese Unexamined Patent Publication No. 2017-70066, WO/2017/098840 and the like may be used.

Figure 16:
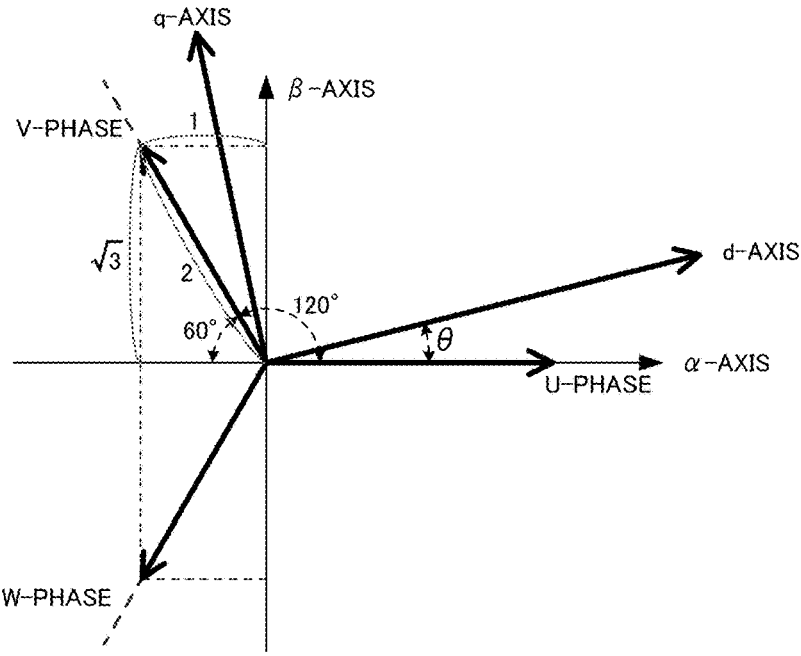
FIG. 16 is a diagram showing an operation example of the space vector modulating section.

That is, the space vector modulation has a function that performs a following coordinate transformation based on the voltage command values vd and vq on the dq-axes space, the motor rotational angle θ and sector number n (#1 to #6), and controls the rotation of the motor by supplying switching patterns S1 to S6 to the motor. The switching patterns S1 to S6 are corresponding to the sectors #1 to #6, and control turning-ON/turning-OFF of the FETs (the upper arm Q1, Q3 and Q5, and the lower arm Q2, Q4 and Q6) of the inverter with the bridge configuration. With reference to the coordinate transformation, in the space vector modulation, the coordinate transformation to the voltage vectors Vα and Vβ, in the α-β, coordinate system based on an Expression 2 is performed to the voltage command values vd and vq. A relationship between the coordinate axes that are used in this coordinate transformation and the motor rotational angle θ is shown in FIG. 16.

$$\begin{bmatrix} V\alpha \\ V\beta \end{bmatrix} = \begin{bmatrix} \cos\theta & -\sin\theta \\ \sin\theta & \cos\theta \end{bmatrix} \begin{bmatrix} vd^{} \\ vq^{} \end{bmatrix} \qquad \text{[Expression 2]}$$

A relationship shown in an Expression 3 between a target voltage vector in the d-q coordinate system and a target voltage vector in the α-β coordinate system is existed. The absolute value of the target voltage vector V is conserved.

$$|V| = \sqrt{(vd^{})^2 + (vq^{})^2} = \sqrt{V\alpha^2 + V\beta^2} \qquad \text{[Expression 3]}$$

Figure 17:
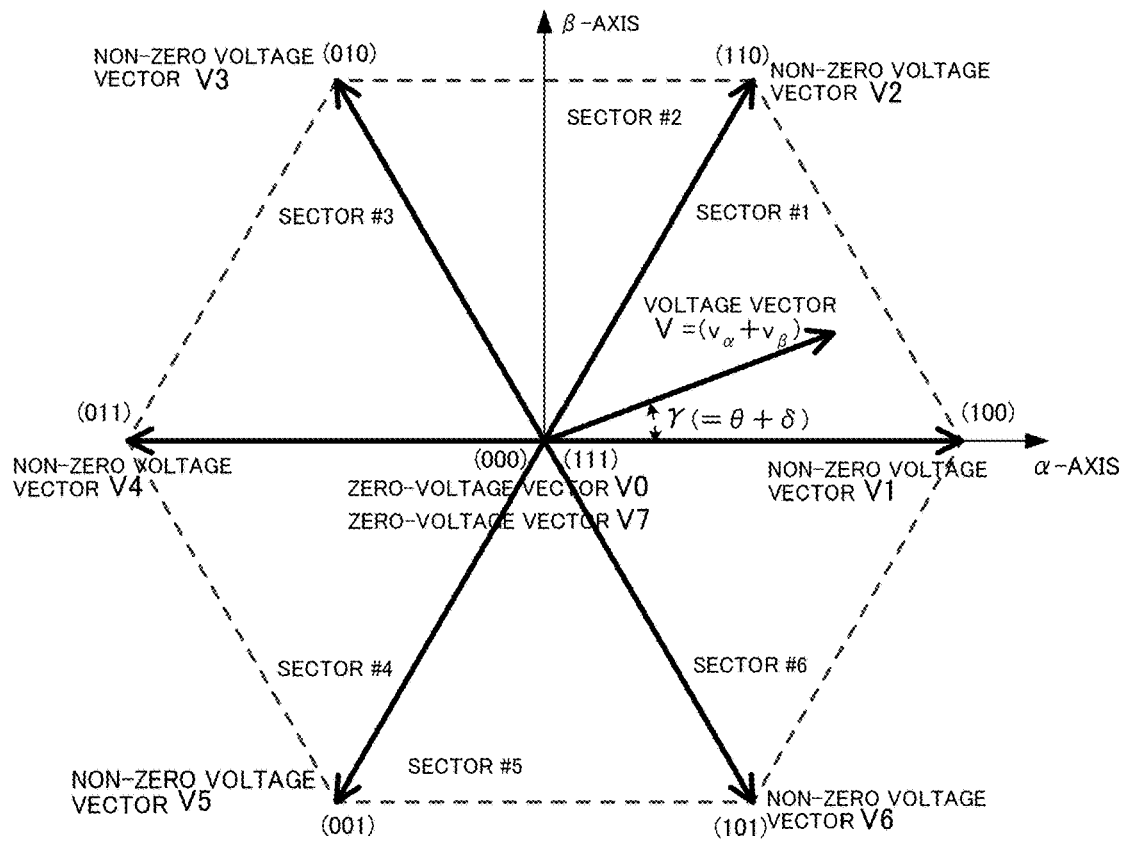
FIG. 17 is a diagram showing an operation example of the space vector modulating section.

In the switching pattern of the space vector control, the output voltage is defined by using eight discrete reference output voltage vectors V0 to V7 (non-zero voltage vectors V1 to V6 that the phase differs every π/3 [rad] and zero voltage vectors V0 and V7) that are shown in the space vector diagram of FIG. 17, depending on the switching patterns S1 to S6 of the FETs (Q1 to Q6). The selection of these reference output voltage vectors V0 to V7 and the occurring time are controlled. By using six regions sandwiched between adjacent reference output voltage vectors, the space vector can be divided into the six sectors #1 to #6, and the target voltage vector V is belong to any one of the sectors #1 to #6, and can be assigned to the sector number. The target voltage vector V is a synthetic vector of Vα and Vβ and there are six sectors in a regular hexagon on the α-β space, as shown in FIG. 17. Which sector that the target voltage vector V exists can be determined based on the rotational angle γ in the α-β coordinate system of the target voltage vector V. The rotational angle γ is determined by a sum of the rotational angle θ of the motor and a phase δ obtained from the relationship of the voltage command values vd and vq in the d-q coordinate system (γ=θ+δ).

Figure 18:
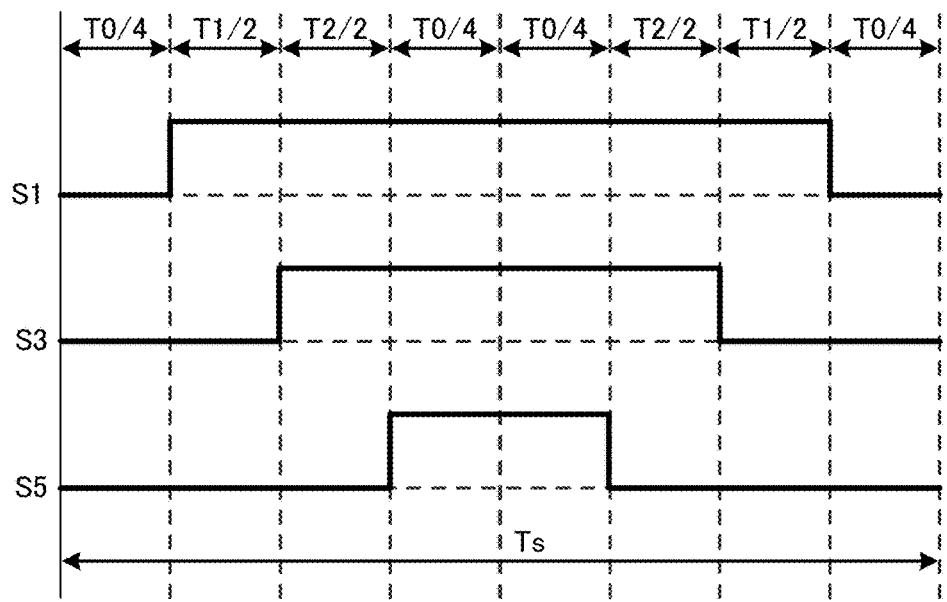
FIG. 18 is a timing chart showing an operation example of the space vector modulating section.

FIG. 18 shows a basic timing chart that the switching pulse width and the timing in the turning-ON/turning-OFF signals S1 to S6 (switching patterns) to the FETs are determined in order to output the target voltage vector V from the inverter by a digital control by means of the switching patterns S1, S3 and S5 of the inverter in the space vector control. The space vector modulation performs the calculation and the like in every defined sampling period Ts, and outputs the respective pulse widths and the timings in the switching patterns S1 to S6 to which the calculation result is transformed in the next sampling period Ts.

The space vector modulation generates the switching patterns S1 to S6 depending on the sector number that is obtained based on the target voltage vector V. In FIG. 18, in a case of the sector number #1 (n=1), one example of the switching patterns S1 to S6 of the inverter is shown. The signals S1, S3 and S5 show the gate signals of the switching devices Q1, Q3 and Q5 that are corresponding to the upper arm. The horizontal axis denotes a time, and Ts is corresponding to the switching period and is divided into eight periods, T0/4, T1/2, T2/2, T0/4, T0/4, T2/2, T1/2 and T0/4. The periods T1 and T2 are the time depending on the sector number n and the rotational angle γ.

Figure 19:
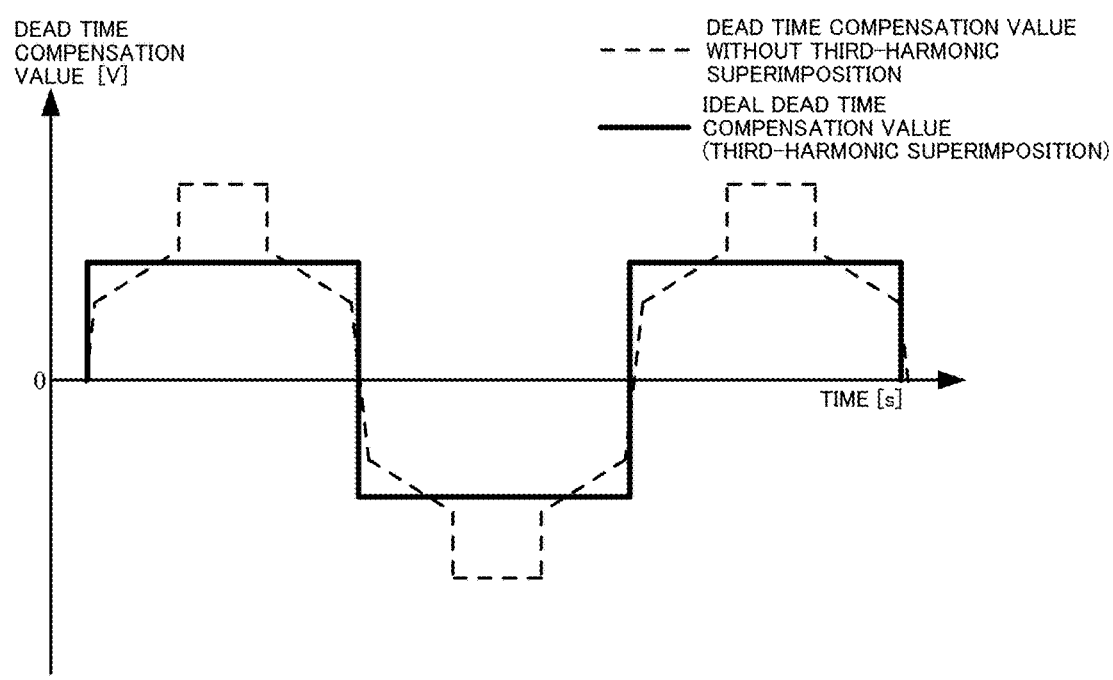
FIG. 19 is a waveform chart showing an effect of the space vector modulating section.

In a case that the space vector modulation is not performed, the dead time compensation of the present embodiment is applied on the dq-axes, and the dead time compensation value waveform (the U-phase waveform) that the dq-axes/3-phase converting is performed to only the dead time compensation value is shown in a waveform represented by a dashed line of FIG. 19 that the third-order component is removed. The same phenomena are exhibited in the V-phase and the W-phase. By applying the space vector modulation instead of the dq-axes/3-phase converting, the third-harmonic can be superimposed on the 3-phase signals, the third-order component that is removed by the 3-phase converting can be compensated, and the ideal dead time compensation waveform that is shown in a solid line of FIG. 19 can be generated.

Figure 20:
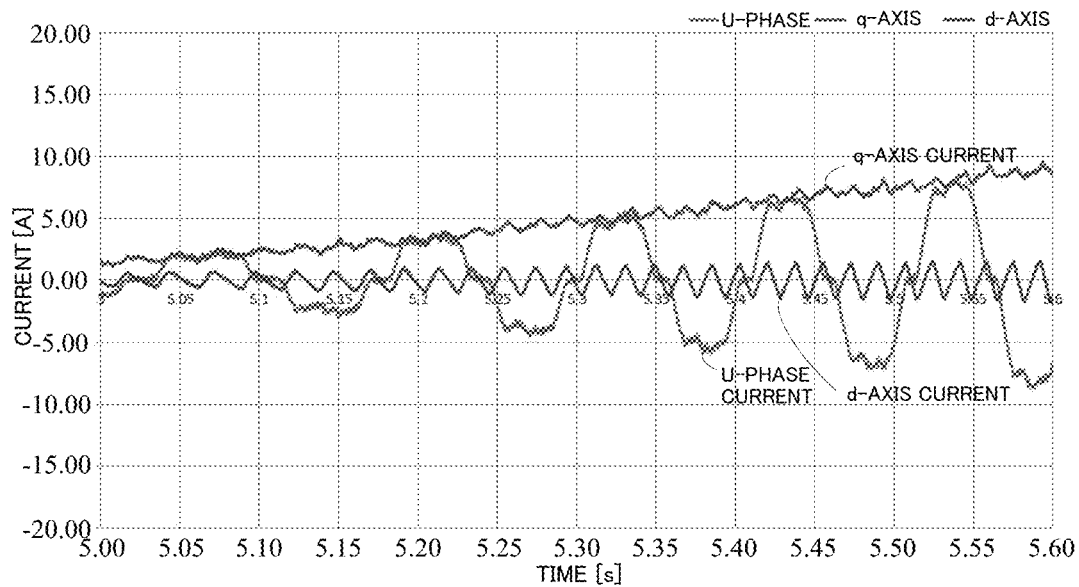
FIG. 20 is a waveform chart showing an effect of the present invention (the first embodiment)
Figure 21:
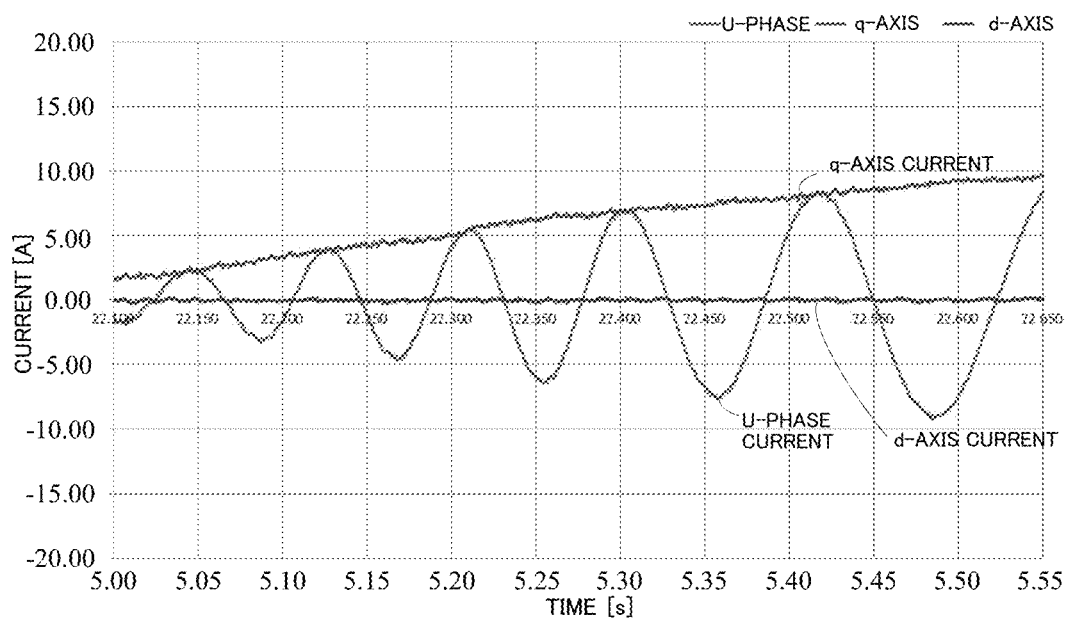
FIG. 21 is a waveform chart showing an effect of the present invention (the first embodiment)

FIGS. 20 and 21 are simulation results showing effects of the present embodiment. FIG. 20 shows the U-phase current, the d-axis current and the q-axis current in a case of "without the dead time compensation". By applying the dead time compensation of the present embodiment, in the low speed and middle speed steering states, the improvements in the waveform distortion of the phase currents and the dq-axes currents as shown in FIG. 21 (the ripple is reduced in the dq-axes current waveforms and the phase currents whose waveforms are almost sinusoidal are obtained) can be confirmed. The torque ripple in steering and the steering sound are improved.

FIGS. 20 and 21 typically show the U-phase current.

Next, the second embodiment of the present invention will be described.

Figure 22:
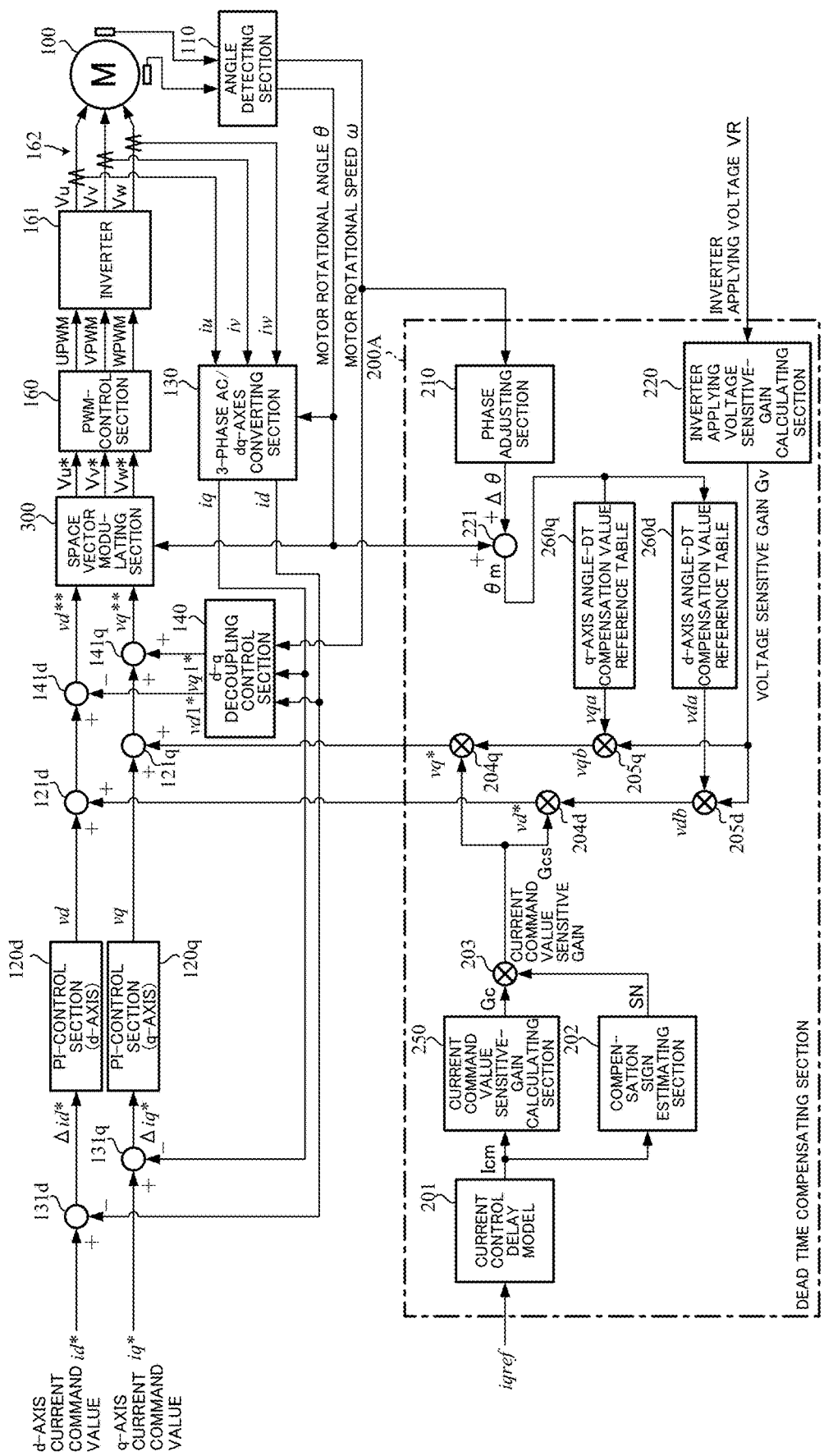
FIG. 22 is a block diagram showing a configuration example (the second embodiment) of the present invention.
Figure 23:
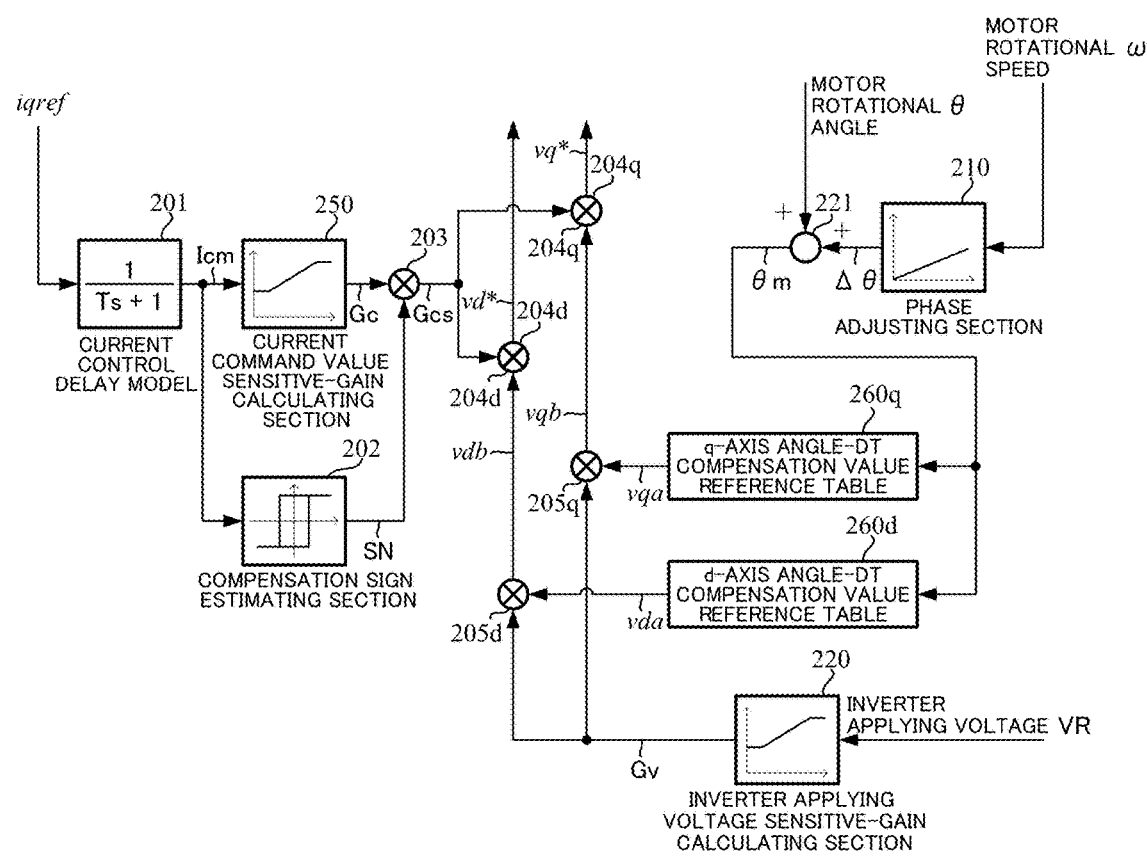
FIG. 23 is a block diagram showing the detail configuration example (the second embodiment) of the dead time compensating section according to the present invention.

FIG. 22 shows an overall configuration of the second embodiment of the present invention corresponding to FIG. 5 and there is provided the dead time compensating section 200A to calculate the dead time compensation values vd* and vq*. The detail configuration of the dead time compensating section 200A is shown in FIG. 23 and the explanation is performed with reference to FIG. 23 as follows.

The dead time compensating section 200A comprises the current control delay model 201, the compensation sign estimating section 202, the phase adjusting section 210, the inverter applying voltage sensitive-gain calculating section 220, the adding section 221, the multiplying sections 203, 204d and 204q, and the current command value sensitive-gain calculating section 250 which have a similar configuration and a similar operation as those of the first embodiment. In the second embodiment, there are provided a d-axis angle-dead time compensation value reference table 260d to input the motor rotational angle θm from the adding section 221 and output the d-axis dead time reference compensation value vda, and a q-axis angle-dead time compensation value reference table 260q to input the motor rotational angle θm from the adding section 221 and output the q-axis dead time reference compensation value vqa in the dead time compensating section 200A. The dead time reference compensation values vda and vqa are respectively inputted into the multiplying sections 205d and 205q and are multiplied by the voltage sensitive gain Gv from the inverter applying voltage sensitive-gain calculating section 220, and the dq-axes dead time compensation values vdb and vqb which are multiplied the dead time reference compensation values vda and vqa by the voltage sensitive gain Gv are respectively inputted into the multiplying sections 204d and 204q. The current command value sensitive gain Gcs is inputted into the multiplying sections 204d and 204q, and the dead time compensation values vd* and vq* that are the multiplied results in which the dq-axes dead time compensation values vdb and vqb are multiplied by the current command value sensitive gain Gcs are outputted from the multiplying sections 204d and 204q.

Figure 24:
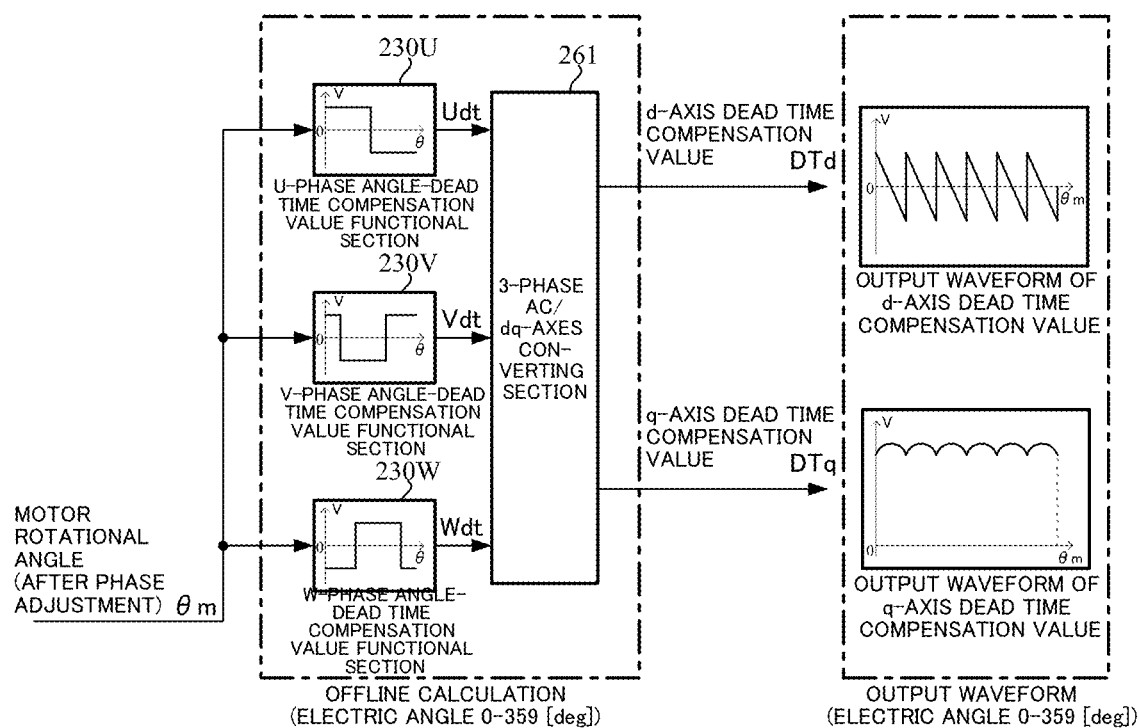
FIG. 24 is a diagram showing an operation example (the second embodiment) of the angle-dead time compensation value functional section.

As shown in FIG. 24 in detail, the angle-dead time compensation value reference tables 260d and 260q calculate the dead time compensation values which are needed in the 3-phases and are the functions of the angle in offline, and convert the dead time compensation values into the dead time compensation values on the dq-axes. That is, as described in the first embodiment, the angle-dead time compensation value functional sections 230U, 230V and 230W respectively output respective phase rectangular wave dead time reference compensation values Udt, Vdt and Wdt whose phases are shifted each other by 120 [deg] in a range of 0 to 359 [deg] in the electric angle, for the phase-adjusted motor rotational angle $θ_m$. The angle-dead time compensation value functional sections 230U, 230V and 230W treat the dead time compensation values, which are needed in the three phases, as functions depending on the angle, calculate the dead time compensation values in offline, and output the dead time reference compensation values Udt, Vdt and Wdt. The angle functions of the dead time reference compensation values Udt, Vdt and Wdt are different depending on the characteristic of the dead time in the ECU.

Figure 25A:
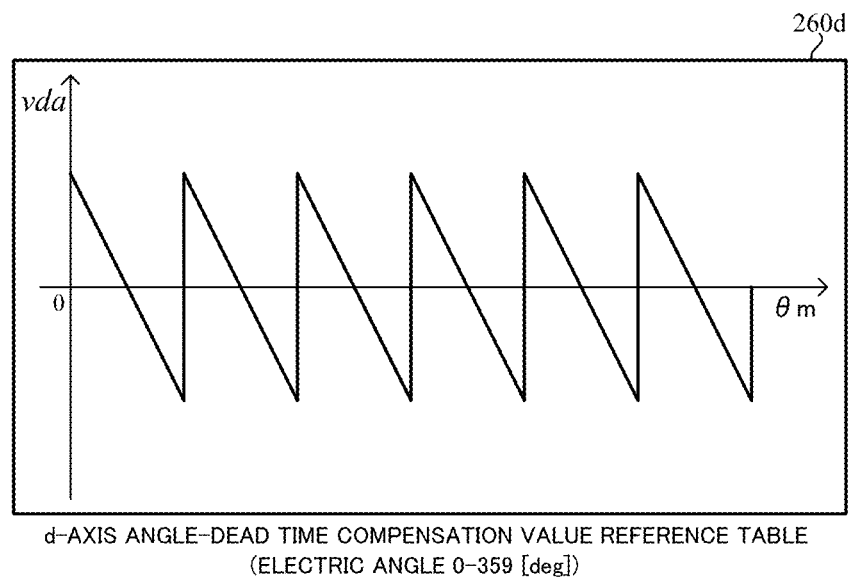
FIGS. 25A and 25B are characteristic diagrams showing output voltage characteristic examples of angle-dead time compensation value reference tables.
Figure 25B:
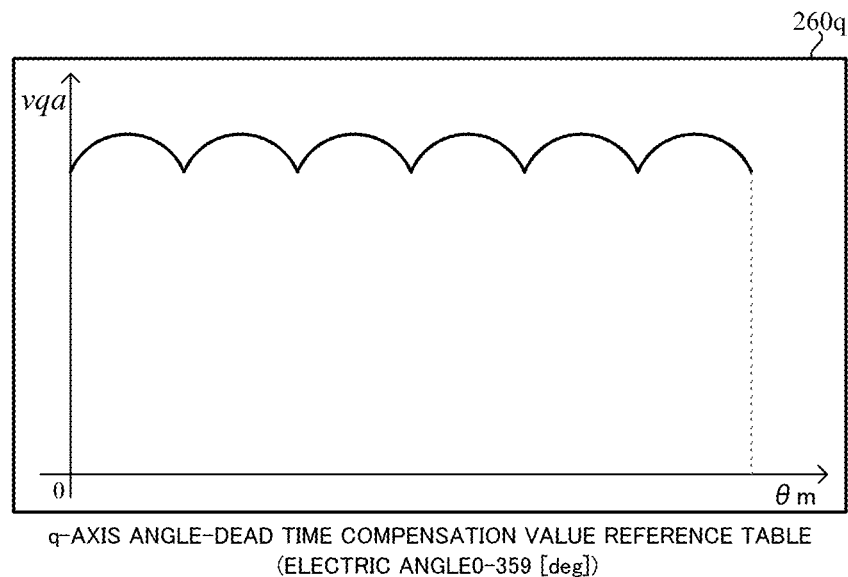

The dead time reference compensation values Udt, Vdt and Wdt are inputted into the 3-phase AC/dq-axes converting section 261 and are converted into the d-axis dead time compensation value DTd and the q-axis dead time compensation value DTq whose output waveforms are shown in FIG. 24. The angle-dead time compensation value reference tables 260d and 260q whose input is the angle $θ_m$ are generated based on the dq-axes output waveforms in FIG. 24. As shown in FIG. 25A, the d-axis angle-dead time compensation value reference table 260d has an output voltage characteristic (the d-axis dead time reference compensation value) having a saw-tooth waveform to the motor rotational angle $θ_m$. As shown in FIG. 25B, the q-axis angle-dead time compensation value reference table 260q has an output voltage characteristic (the q-axis dead time reference compensation value) whose waveform is continuous arcs which are added with the offset voltage.

The dead time reference compensation values vda and vqa from the angle-dead time reference compensation value tables 260d and 260q are respectively inputted into the multiplying sections 205d and 205q, and are multiplied by the voltage sensitive gain $G_v$. The dq-axes dead time compensation values vdb and vqb which are multiplied by the voltage sensitive gain $G_v$ are respectively inputted into the multiplying sections 204d and 204q, and are multiplied by the current command value sensitive gain $G_{cs}$. The dead time compensation values vd* and vq* from the multiplying sections 204q and 204q are respectively inputted into the adding sections 121d and 121q, are added to the voltage command values vd and vq and the added results are inputted into the space vector modulating section 300 as the voltage command values vd and vq via the subtracting section 141d and the adding section 141q.

In the present embodiment, the configuration that the dead time compensation values are calculated from the angle-dead time compensation value reference tables which are a function depending on the motor rotational angle (the electric angle) and directly compensate the voltage command values on the dq-axes by the feed-forward control, is adopted. The compensation sign of the dead time is obtained by using the steering assist command value (iqref), and the compensation amount is variable so that the magnitude of the compensation amount becomes optimal depending on the magnitude of the steering assist command value and the magnitude of the inverter applying voltage.

Figure 26:
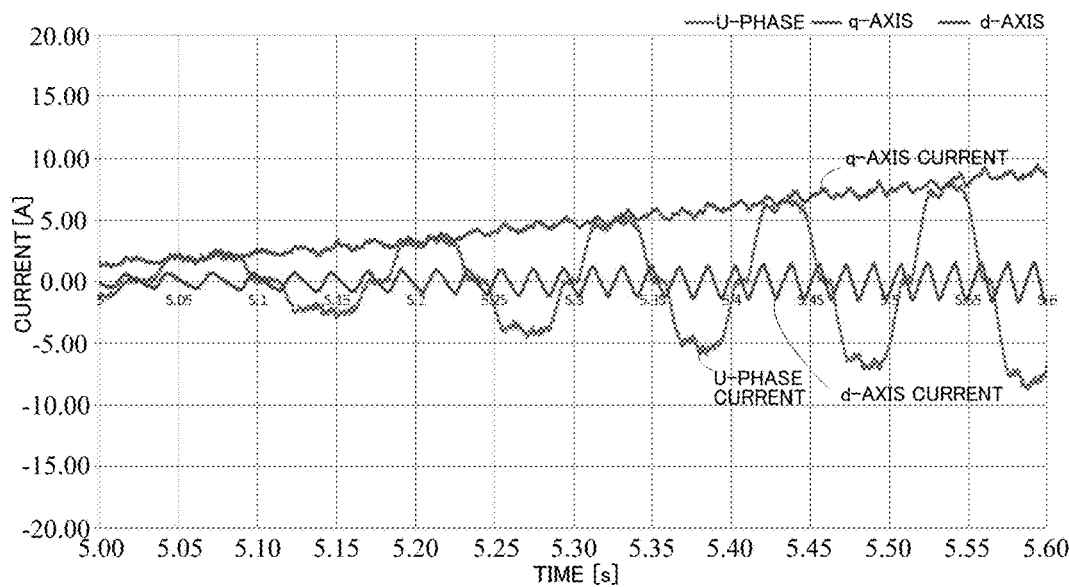
FIG. 26 is a waveform chart showing an effect of the present invention (the second embodiment)
Figure 27:
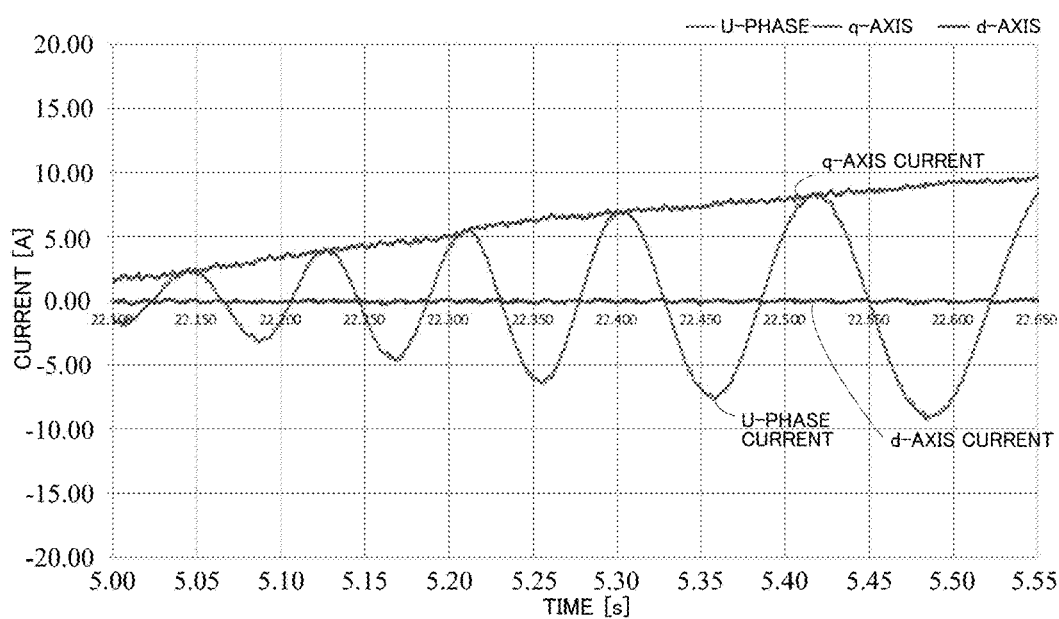
FIG. 27 is a waveform chart showing an effect of the present invention (the second embodiment)

FIGS. 26 and 27 are the results in a bench test apparatus to which the actual vehicle is simulated, which show the effects of the second embodiment in the U-phase, and FIG. 26 shows the U-phase current, the d-axis current and the q-axis current in a case of "without the dead time compensation". By applying the dead time compensation of the present embodiment, in the low speed and middle speed steering states, the improvements in the waveform distortions of the phase currents and the dq-axes currents are shown in FIG. 27 (the ripple is reduced in the dq-axes current waveforms and the phase currents whose waveforms are almost sinusoidal are obtained) can be confirmed. The torque ripple in the steering and the steering sound are also improved.

Figure 28:
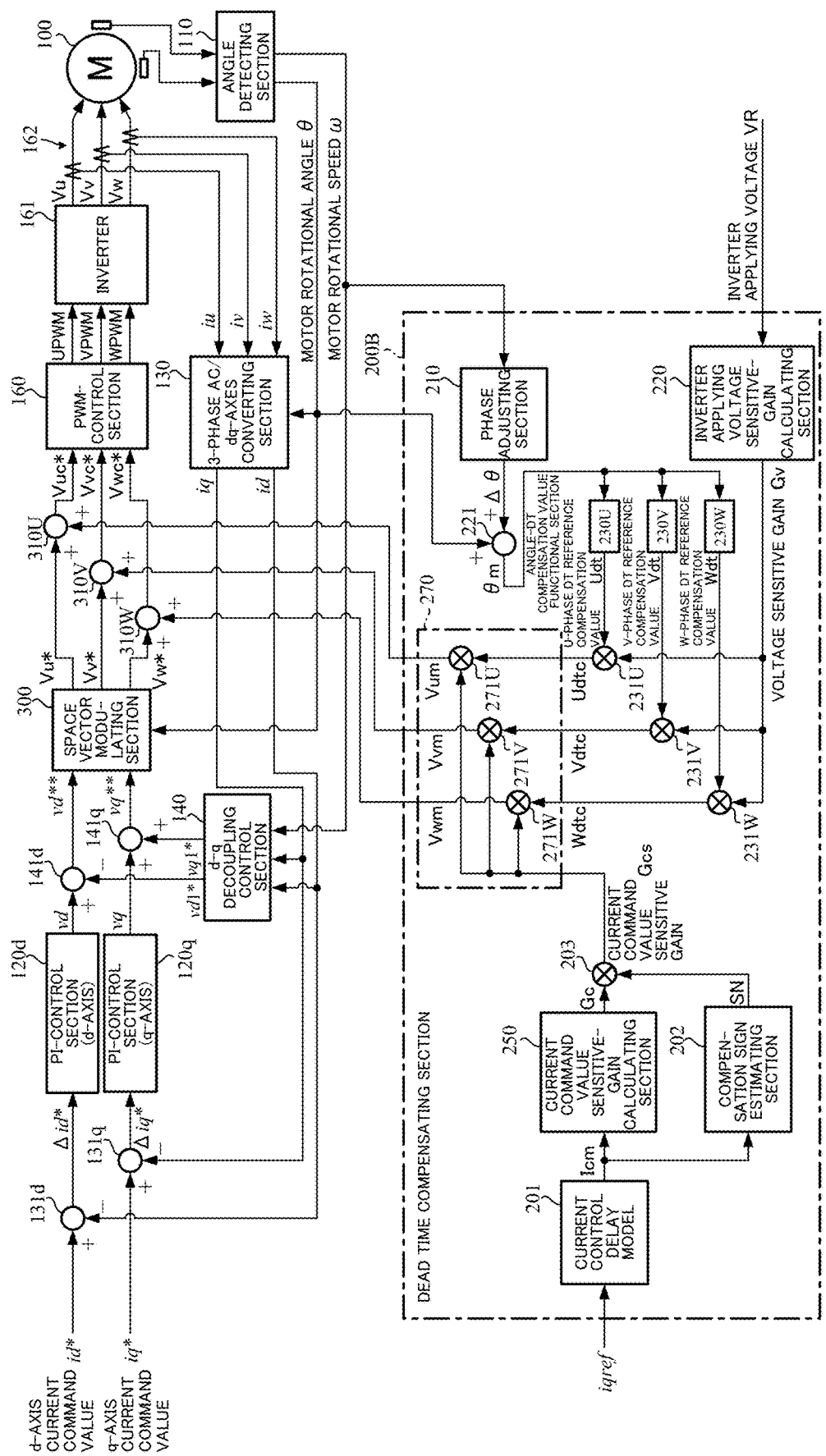
FIG. 28 is a block diagram showing a configuration example (the third embodiment) of the present invention.
Figure 29:
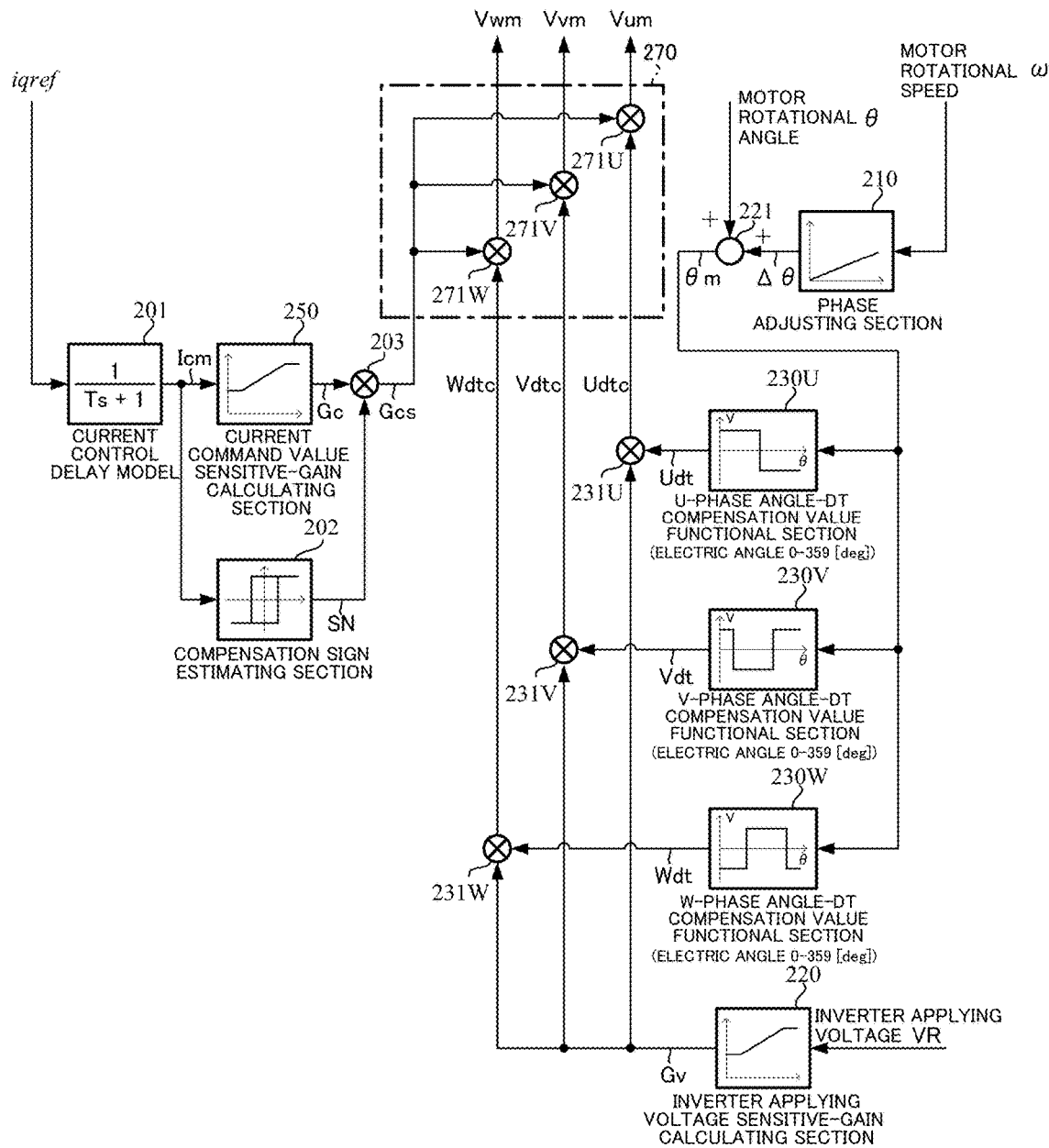
FIG. 29 is a block diagram showing the detail configuration example (the third embodiment) of the dead time compensating section according to the present invention.

Next, FIG. 28 shows an overall configuration of the third embodiment of the present invention corresponding to FIG. 5 and the detail configuration of the dead time compensating section 200B is shown in FIG. 29. In the third embodiment, the dead time compensating section 200B performs the dead time compensation by calculating the 3-phase dead time compensation values Vum, Vvm and Vwm and adding the 3-phase dead time compensation values Vum, Vvm and Vwm to the 3-phase voltage command values Vu*, Vv* and Vw* from the space vector modulating section 300, respectively.

In the third embodiment, there is provided the compensation value adjusting section 270 which comprises multiplying sections 271U, 271V and 271W. The dead time compensation values Udtc, Vdtc and Wdtc are respectively inputted into the multiplying sections 271U, 271V and 271W, and are multiplied by the voltage sensitive gain $G_{cs}$. The multiplied results in which the dead time compensation values Udtc, Vdtc and Wdtc are multiplied by the voltage sensitive gain $G_{cs}$ are outputted as the dead time compensation values Vum, Vvm and Vwm. The dead time compensation values Vum, Vvm and Vwm are added with the 3-phase space vector-modulated voltage commands Vu*, Vv*and Vw* at adding sections 310U, 310V and 310W, respectively. The voltage command values Vuc*, Vvc* and Vwc* which are the added results are inputted into the PWM-control section 160.

In the present embodiment, the configuration that the dead time compensation values are treated as the 3-phase function depending on the motor rotational angle (the electrical angle) and directly compensate the 3-phase voltage command values by the feed-forward control, is adopted. The compensation sign of the dead time is obtained by using the dq-axes steering assist command values, and the compensation amount is variable so that the magnitude of the compensation amount becomes optimal depending on the magnitude of the steering assist command values and the magnitude of the inverter applying voltage.

Figure 30:
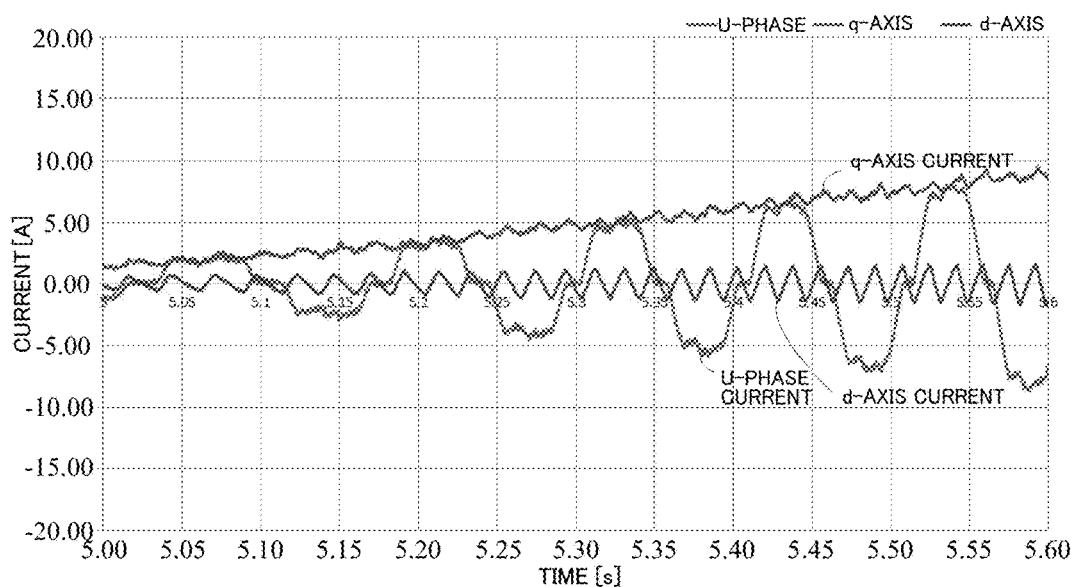
FIG. 30 is a waveform chart showing an effect of the present invention (the third embodiment)
Figure 31:
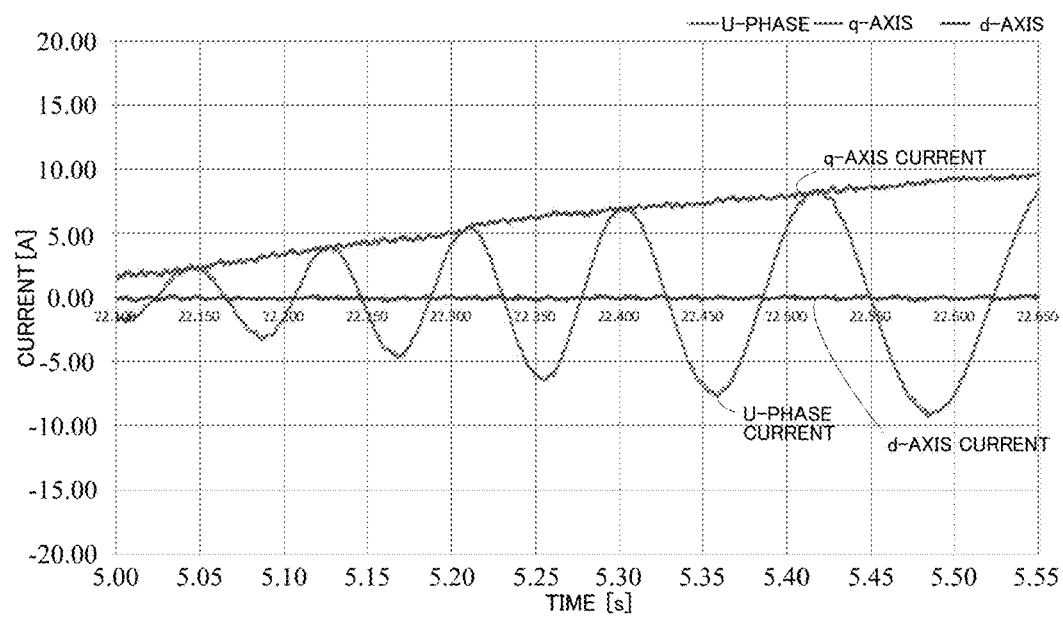
FIG. 31 is a waveform chart showing an effect of the present invention (the third embodiment)

FIGS. 30 and 31 are the simulation results showing the effects of the present embodiment in the U-phase, and FIG. 30 shows the U-phase current, the d-axis current and the q-axis current in a case of "without the dead time compensation". By applying the dead time compensation of the present embodiment, in the low speed and middle speed steering states, the improvements in the waveform distortions of the phase currents and the dq-axes currents as shown in FIG. 31 (the ripple is reduced in the dq-axes current waveforms and the phase currents whose waveforms are almost sinusoidal are obtained) can be confirmed. The torque ripple in the steering and the steering sound are also improved.

Next, the embodiment (the fourth embodiment) which adds a function that the motor rotational angle is phase-corrected by using the d-axis current command value and the q-axis current command value will be described.

In the middle speed and high speed steering regions, flowing the d-axis current is needed for improving the steering follow-up performance. In this case, the phase of the phase currents to the motor rotational angle (the electric angle) is varied depending on the d-axis current amount. When the dead time compensation is performed by the feed-forward control depending on the motor rotational angle in a state that the d-axis current is flown, the timing of the dead time compensation to the phase currents is deviated and the torque ripple can be generated. In order to resolve the above problem, the dead time compensation is performed by calculating a phase difference (a variation angle) between the motor rotational angle and the phase currents obtained from the d-axis current command value and the q-axis current command value, adding a function that the motor rotational angle is phase-corrected (hereinafter, referred to as "a phase-correction function"), and using the phase-corrected motor rotational angle (the phase-correction rotational angle) obtained by using the phase-correction function. Thereby, the dead time compensation with the small timing deviation can be performed.

Figure 32:
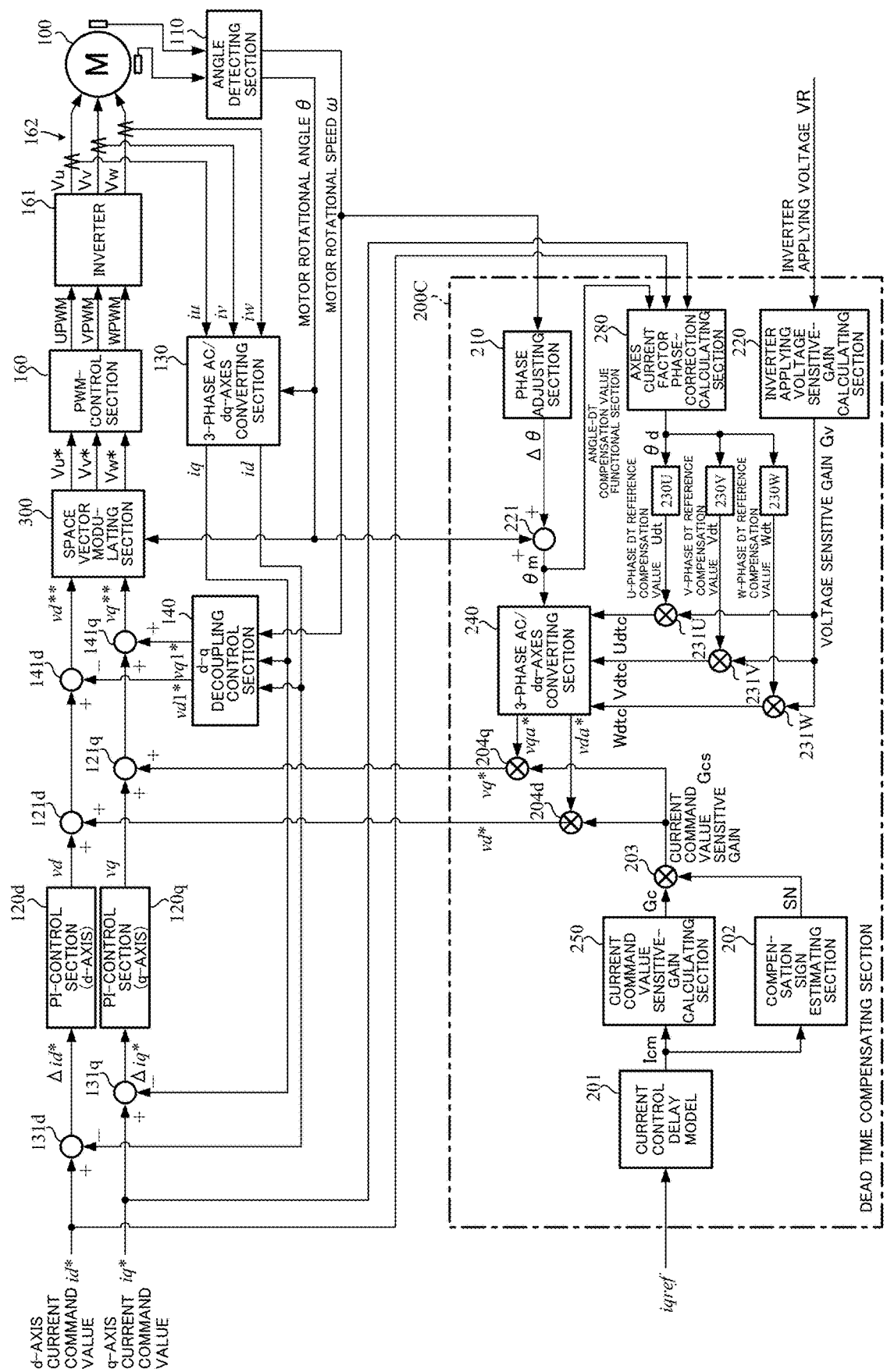
FIG. 32 is a block diagram showing a configuration example (the fourth embodiment) of the present invention.
Figure 33:
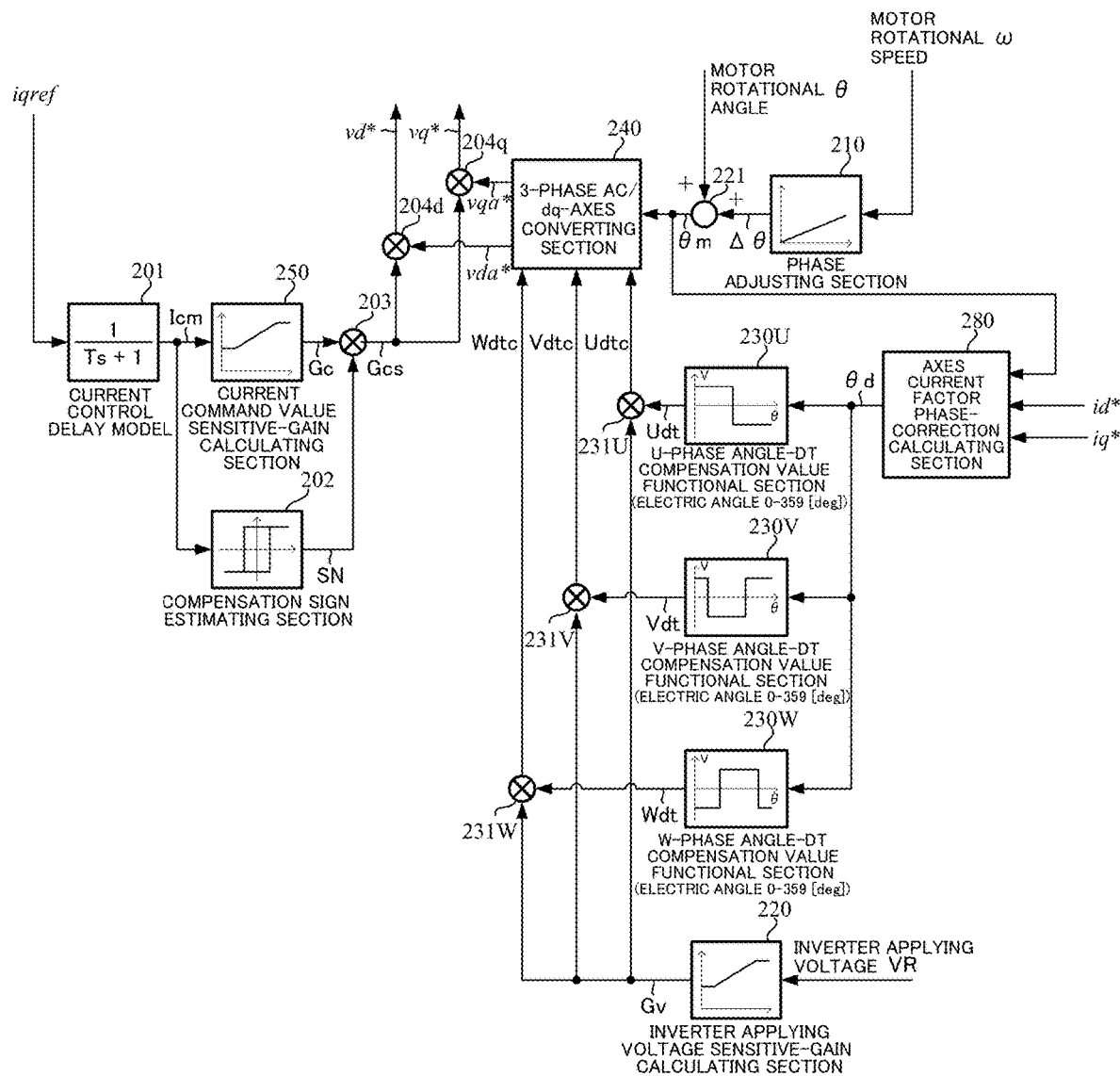
FIG. 33 is a block diagram showing the detail configuration example (the fourth embodiment) of the dead time compensating section according to the present invention.

FIG. 32 shows a configuration example (a configuration of the fourth embodiment) in which the phase-correction function is added against the first embodiment corresponding to FIG. 5, and there is provided an axes current factor phase-correction calculating section 280 to perform the phase-correction function in the dead time compensating section 200C. The detail configuration of the dead time compensating section 200C is shown in FIG. 33. The motor rotational angle $\theta_m$, the d-axis current command value id* and the q-axis current command value iq* are inputted into the axes current factor phase-correction calculating section 280. The phase-correction rotational angle $\theta_d$ outputted from the axes current factor phase-correction calculating section 280 is inputted into the angle-dead time compensation value functional sections 230U, 230V and 230W.

Figure 34:
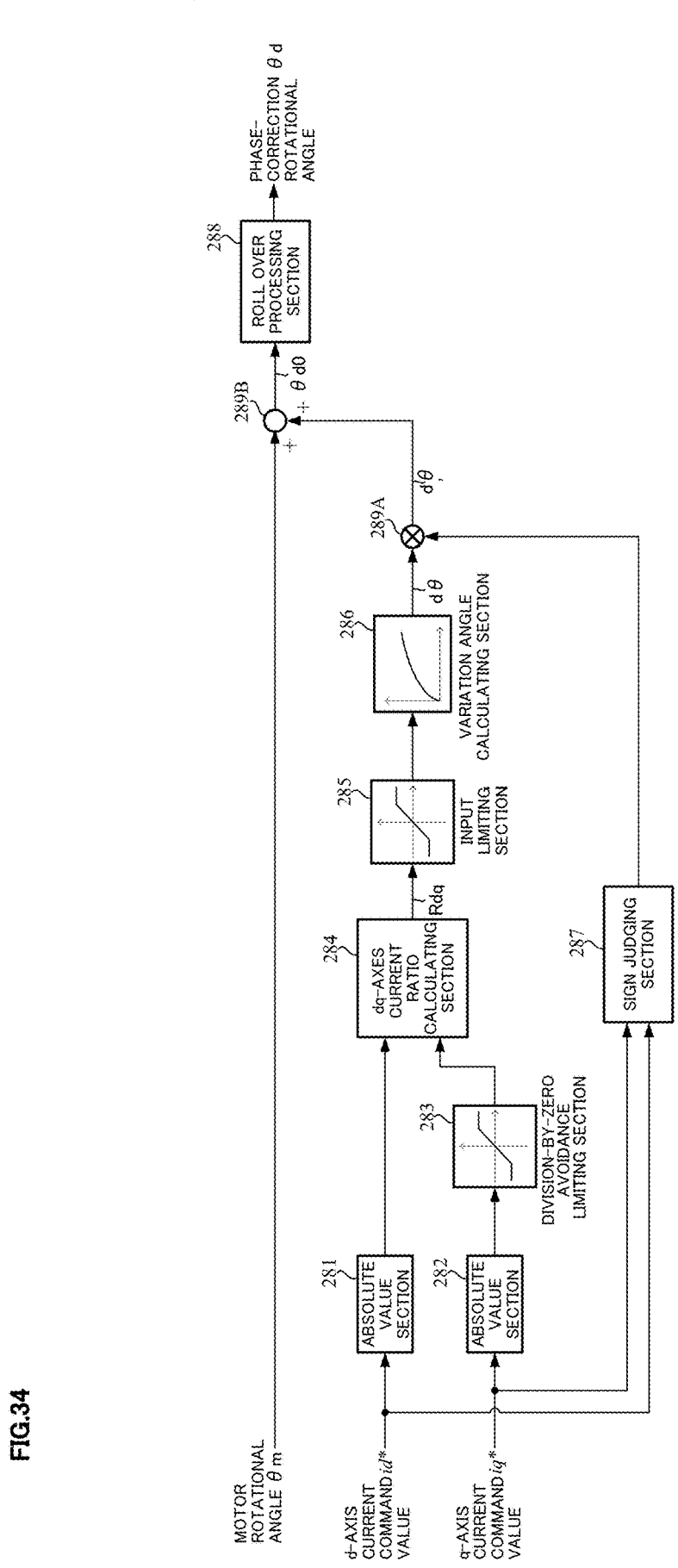
FIG. 34 is a block diagram showing a configuration example of an axes current factor phase-correction calculating section.

The axes current factor phase-correction calculating section 280 calculates the variation angle of the phase current derived from the d-axis current by calculating a current ratio from the d-axis current command value id* and the q-axis current command value iq* and performing the calculation using an arc tangent function (hereinafter, referred to as "arctan calculation"). Further, the axes current factor phase-correction calculating section 280 adds the calculated variation angle to the motor rotational angle $\theta_m$, performs a roll over process to the added result and outputs the phase-correction rotational angle $\theta_d$. FIG. 34 shows a configuration example of the axes current factor phase-correction calculating section 280. The axes current factor phase-correction calculating section 280 comprises absolute value sections 281 and 282, a division-by-zero avoidance limiting section 283, a dq-axes current ratio calculating section 284, an input limiting section 285, a variation angle calculating section 286, a sign judging section 287, a roll over processing section 288, a multiplying section 289A and an adding section 289B.

The dq-axes current ratio calculating section 284 calculates the current ratio Rdq from the d-axis current command value and the q-axis current command value. The absolute values of the d-axis current command value id* and the q-axis current command value iq* are calculated at the absolute sections 281 and 282, respectively. In order that the q-axis current command value iq* which is a denominator in the calculation of the current ratio Rdq avoids to become zero, the absolute value of the q-axis current command value iq* is limited at the division-by-zero avoidance limiting section 283. For example, the limitation that the upper limit value is set to the maximum detection value (for example, 200 [A]) and the lower limit value is set to the minimum detection value which is not 0 [A] (for example, 0.05 [A]) is performed. The dq-axes current ratio calculating section 284 calculates the current ratio Rdq by diving the absolute value of the d-axis current command value id* by the absolute value of the limited q-axis current command value iq*.

In order that the current ratio Rdq which is the object of the arctan calculation is not out of the calculation range, the input limiting section 285 limits the calculation range which serves as the limit value.

The variation angle calculating section 286 performs the arctan calculation to the current ratio Rdq which is limited at the input limiting section 285 and calculate the variation angle de. Considering that a processing load of the CPU installed in the ECU, a table obtained by processing the arctan calculation in offline and converting from radian to degree in the unit of the calculation results is created and the data of the above table are retained in the variation angle calculating section 286. In online, the variation angle calculating section 286 calculates the variation angle d$\theta$ from the current ratio Rdq based on the created table. In a case that the processing load of the CPU is low, the variation angle d$\theta$ may be calculated by performing the arctan calculation and the unit conversion in online. The variation angle d$\theta$ is inputted into the multiplying section 289A.

The sign judging section 287 inputs the d-axis current command value id* and the q-axis current command value iq*, outputs "−" in a case that the sign of the d-axis current command value id* is different from that of the q-axis current command value iq*, and outputs "+" in a case that the sign of the d-axis current command value id* is the same as that of the q-axis current command value iq*. The output value from the sign judging section 287 is inputted into the multiplying section 289A and is multiplied by the variation angle d$\theta$ at the multiplying section 289A, and the multiplied result is inputted into the adding section 289B as the variation angle d$\theta$ '.

The adding section 289B phase-corrects the motor rotational angle $\theta_m$ by adding the variation angle d$\theta$ ' to the motor rotational angle $\theta_m$ and calculates the phase-correction rotational angle $\theta$ d0. In a case that the phase-correction rotational angle $\theta$ d0 is equal to or more than 360 [deg], in order to perform the roll over process that the phase-correction rotational angle $\theta$ d0 is converted into the angle which is in a range of 0 [deg] to 360 [deg], the phase-correction rotational angle $\theta$ d0 is inputted into the roll over processing section 288. The roll over processing section 288 performs the roll over process whose unit is 360 [deg] to the phase-correction rotational angle $\theta$ d0, and which calculates the remainder after dividing the phase-correction rotational angle $\theta$d0 by 360 [deg], and outputs the processed result as the phase-correction rotational angle $\theta$ d.

By using such the configuration and performing the processes in the respective sections, the axes current factor phase-correction calculating section 280 phase-corrects the motor rotational angle $\theta_m$ by using the d-axis current command value id* and the q-axis current command value iq* and calculates the phase-correction rotational angle $\theta$ d.

Figure 35:
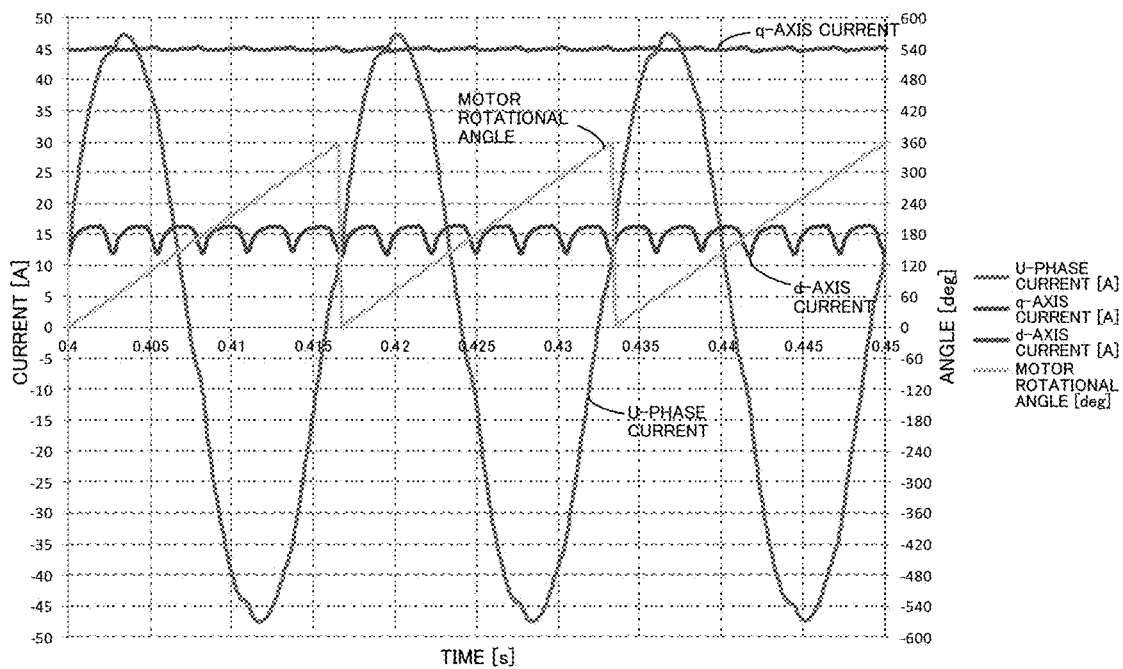
FIG. 35 is a waveform chart showing an effect of the present invention (the fourth embodiment)
Figure 36:
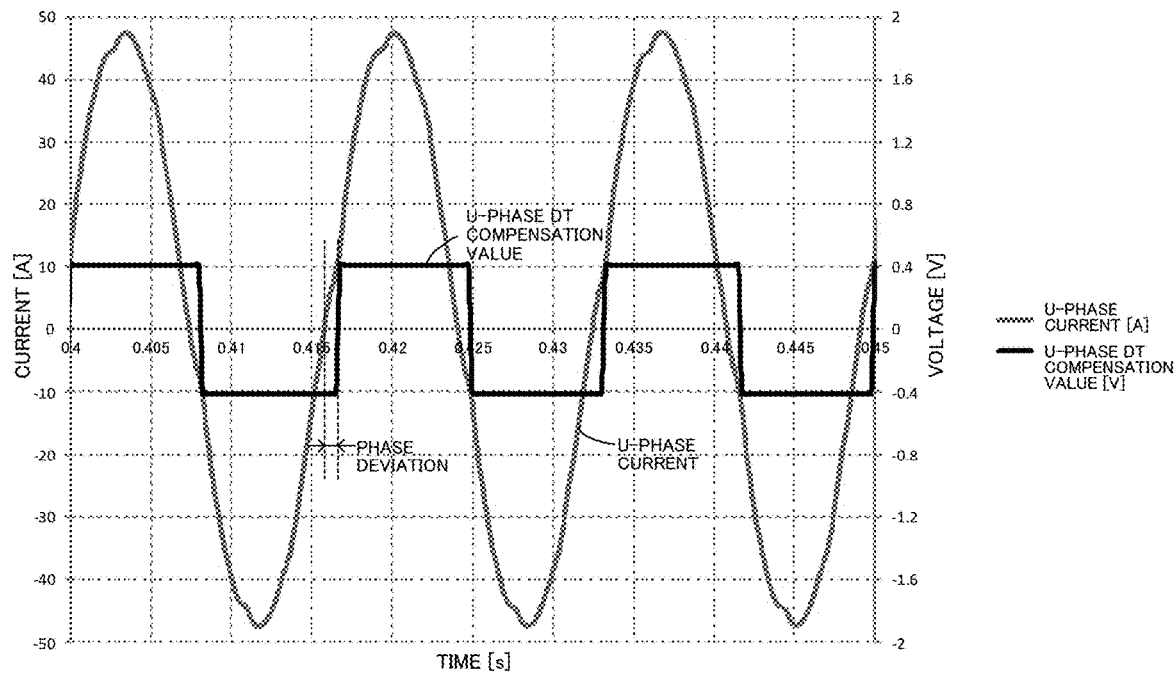
FIG. 36 is a waveform chart showing an effect of the present invention (the fourth embodiment)
Figure 37:
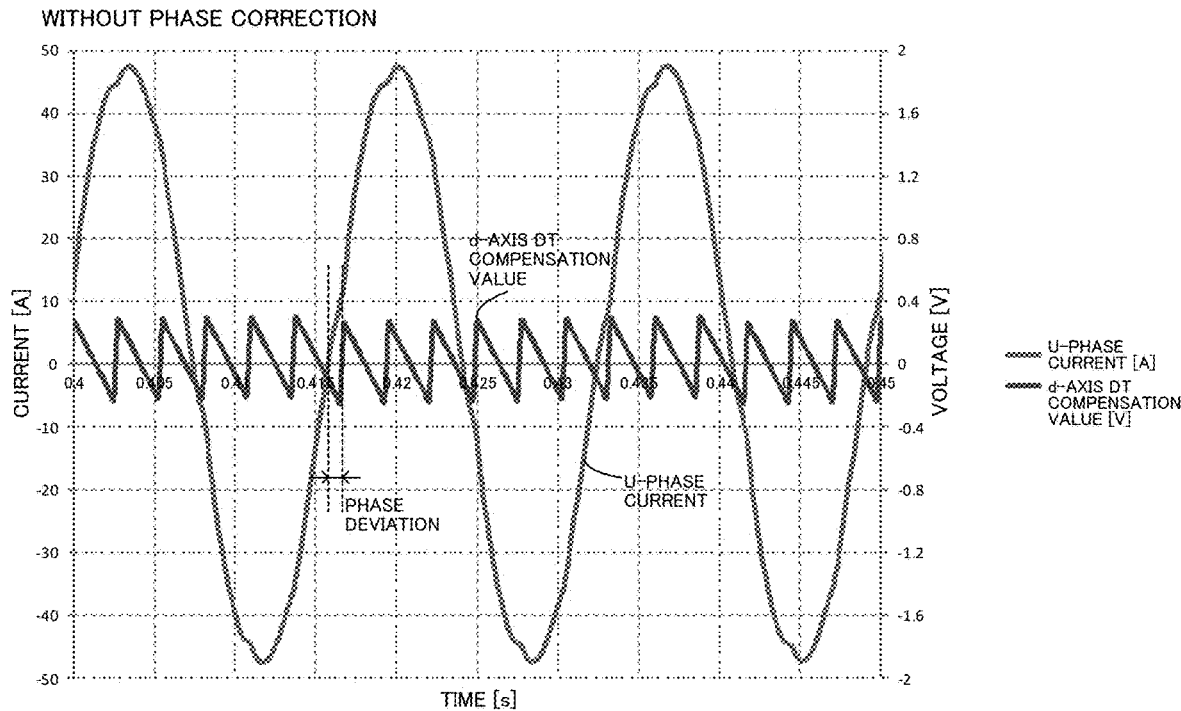
FIG. 37 is a waveform chart showing an effect of the present invention (the fourth embodiment)
Figure 38:
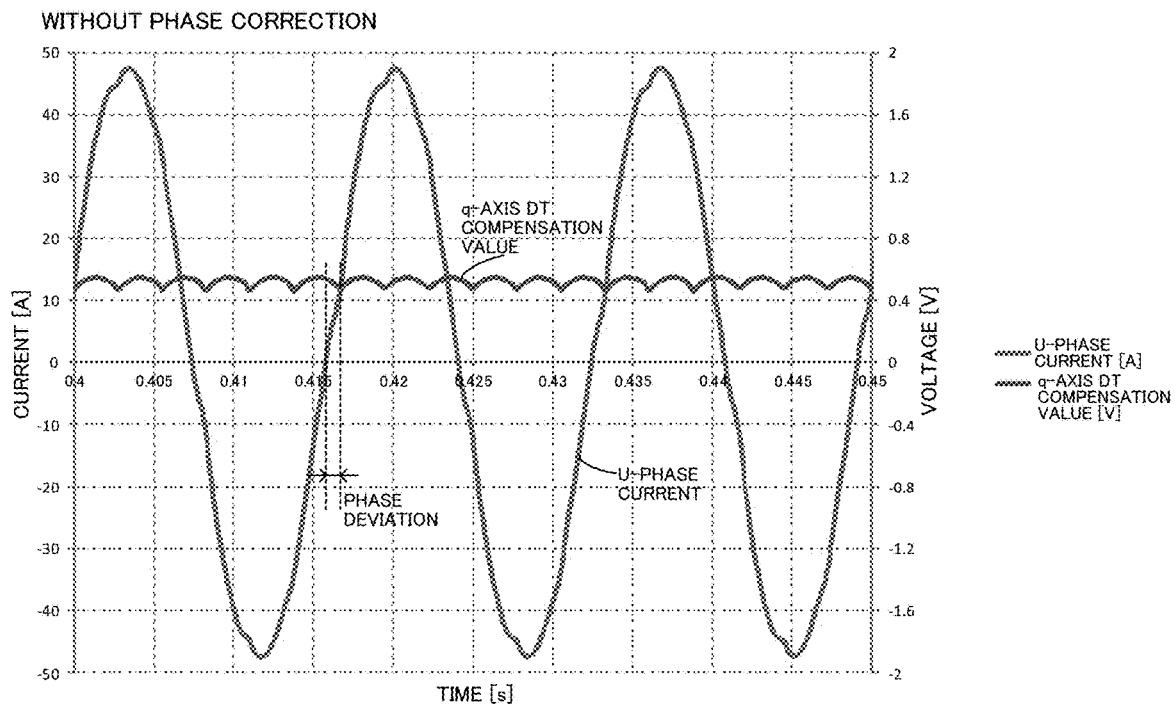
FIG. 38 is a waveform chart showing an effect of the present invention (the fourth embodiment)
Figure 39:
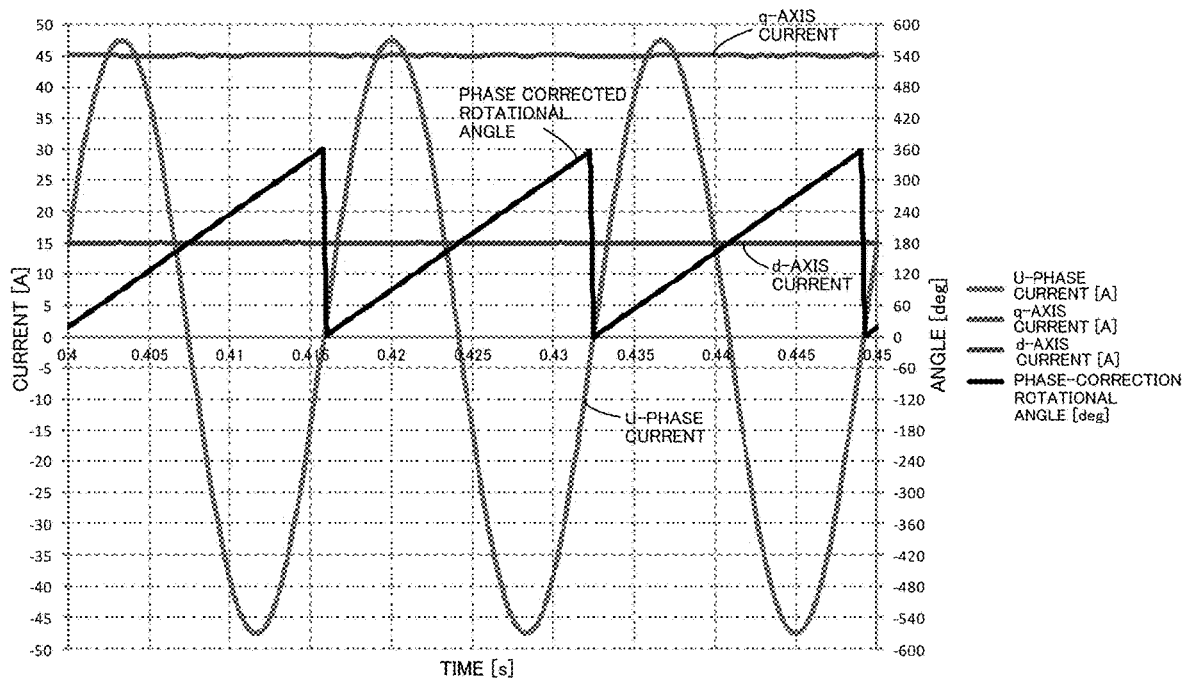
FIG. 39 is a waveform chart showing an effect of the present invention (the fourth embodiment)
Figure 40:
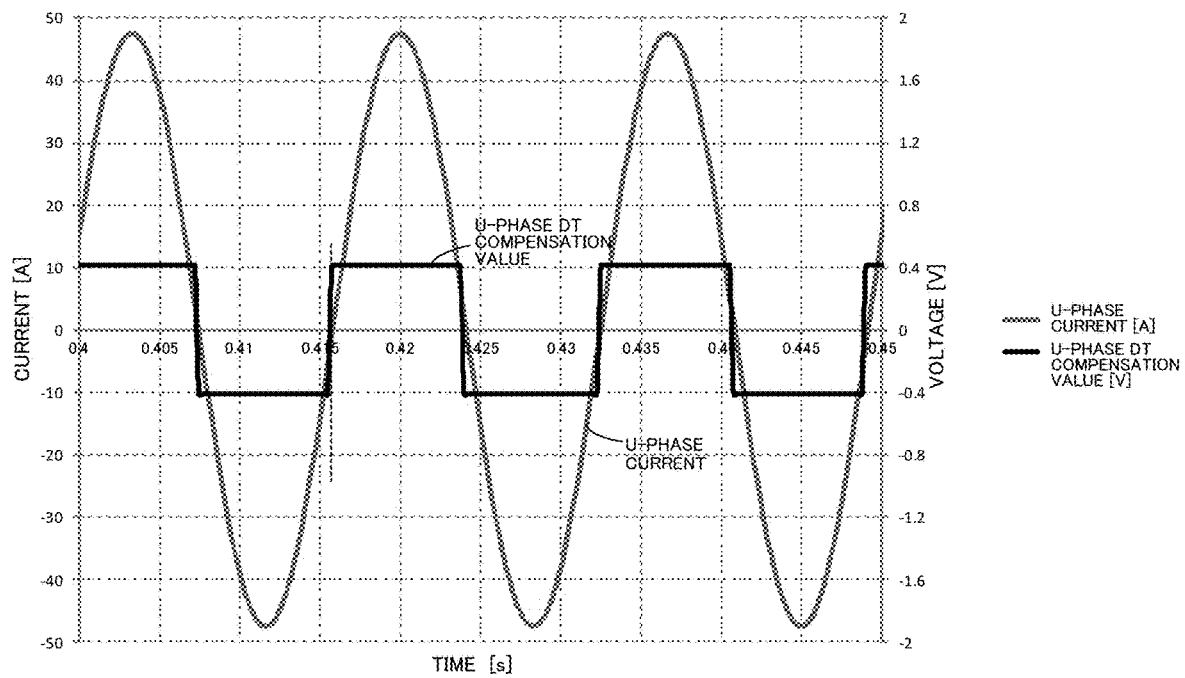
FIG. 40 is a waveform chart showing an effect of the present invention (the fourth embodiment)
Figure 41:
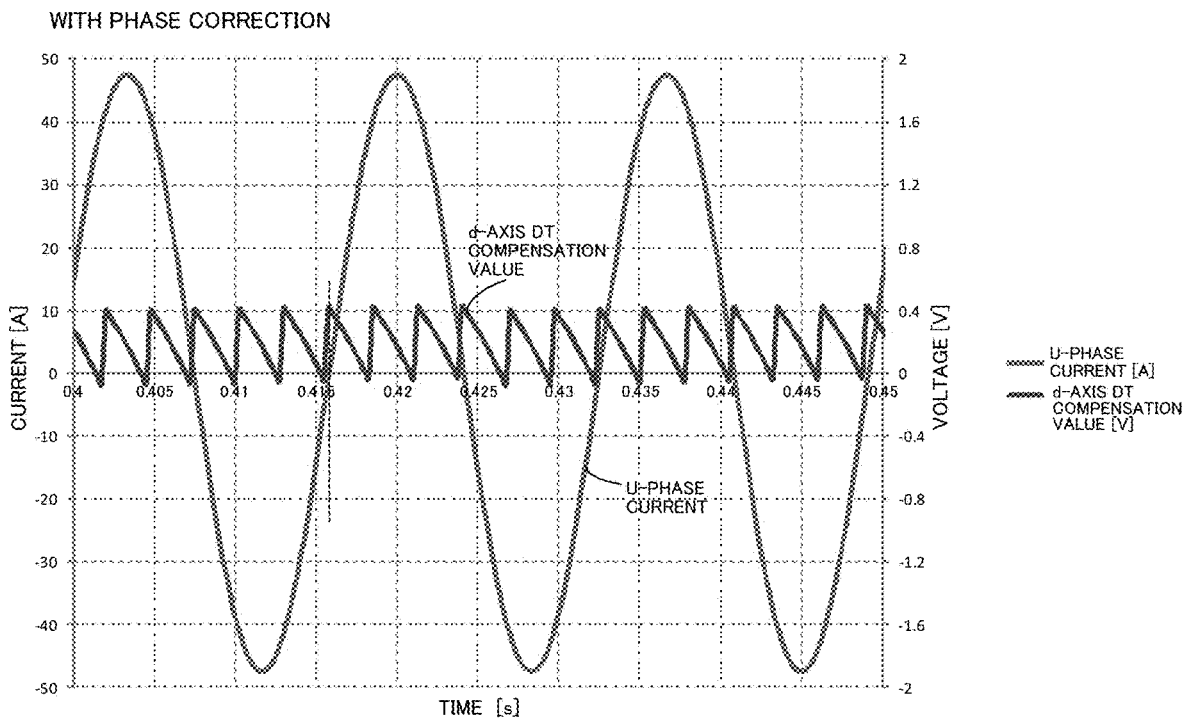
FIG. 41 is a waveform chart showing an effect of the present invention (the fourth embodiment)
Figure 42:
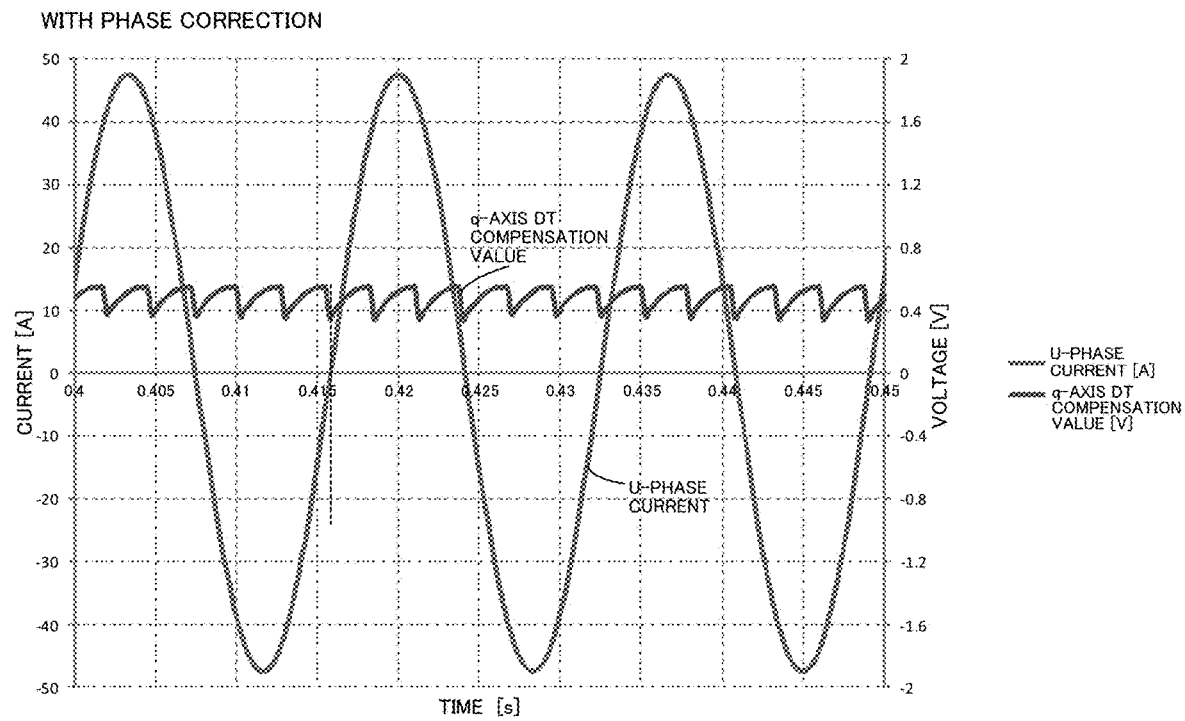
FIG. 42 is a waveform chart showing an effect of the present invention (the fourth embodiment)

To confirm the effect of the phase correction in the present embodiment, in the middle speed steering condition (the motor applying voltage=12 [V], the q-axis current command value=45 [A], the d-axis current command value=15 [A] and the motor rotational speed=1200 [rpm]), the simulation results in cases of "with the phase correction" and "without the phase correction" are shown in FIGS. 35 to 42. FIGS. 35 to 38 show the results of "without the phase correction" and FIGS. 39 to 42 show the results of "with the phase correction". The motor rotational angle (in FIG. 35) or the phase-correction rotational angle (in FIG. 39), the U-phase current, the d-axis current and the q-axis current are shown in FIGS. 35 and 39. The U-phase current and the U-phase dead time compensation value are shown in FIGS. 36 and 40. The U-phase current and the d-axis dead time compensation value are shown in FIGS. 37 and 41. The U-phase current and the dq-axes dead time compensation value are shown in FIGS. 38 and 42.

As shown in FIG. 35, in a case that the d-axis current is flown, the distortions are occurred in the waveforms of the U-phase current, the d-axis current and the q-axis current. In a case that the d-axis current is zero, the zero-crossing point (where the value is crossed with the horizontal axis and is zero) of the U-phase current is coincident with the point where the motor rotational angle is zero. In a case that the d-axis current is flown, it is understood that the phase of the U-phase current is led to the motor rotational angle. Although the U-phase dead time compensation value shown in FIG. 36 is the signal in calculation, it is understood that the phase of the U-phase current is led by flowing the current on the d-axis and the U-phase dead time compensation value is deviated to the U-phase current. In cases of the d-axis dead time compensation value and the q-axis dead time compensation value, similar deviations are occurred as shown in FIGS. 37 and 38.

In contrast, by performing the phase correction depending on the d-axis current in the feed-forward dead time compensation in response to the motor rotational angle, even in a case of flowing the current on the d-axis, it can be confirmed that the timing of the U-phase dead time compensation is consistent with the phase of the U-phase current, as shown in FIG. 40. As shown in FIGS. 41 and 42, even in cases of the d-axis dead time compensation value and the q-axis dead time compensation value, the timings of the d-axis dead time compensation and the q-axis dead time compensation are consistent with the phases of the d-axis current and the q-axis current, respectively. The timing deviation of the feed-forward dead time compensation in response to the motor rotational angle is improved by performing the phase correction according to the present embodiment. As shown in FIG. 39, it can be confirmed that the distortion of the current waveforms is improved, the ripple is reduced in the d-axis current waveform and the q-axis current waveform and the U-phase current waveform substantially becomes the sinusoidal waveform.

Figure 43:
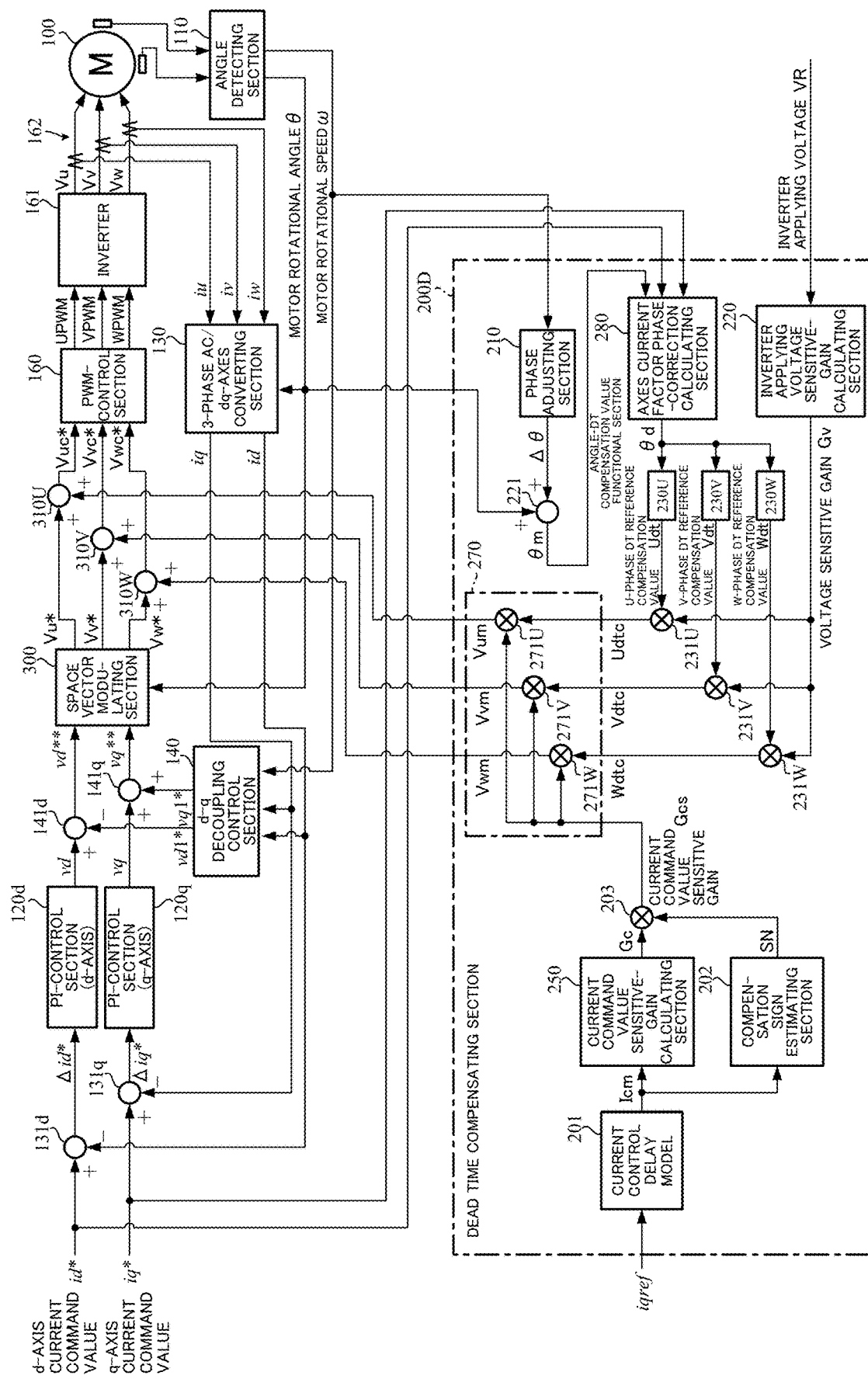
FIG. 43 is a block diagram showing a configuration example (the fifth embodiment) of the present invention.
Figure 44:
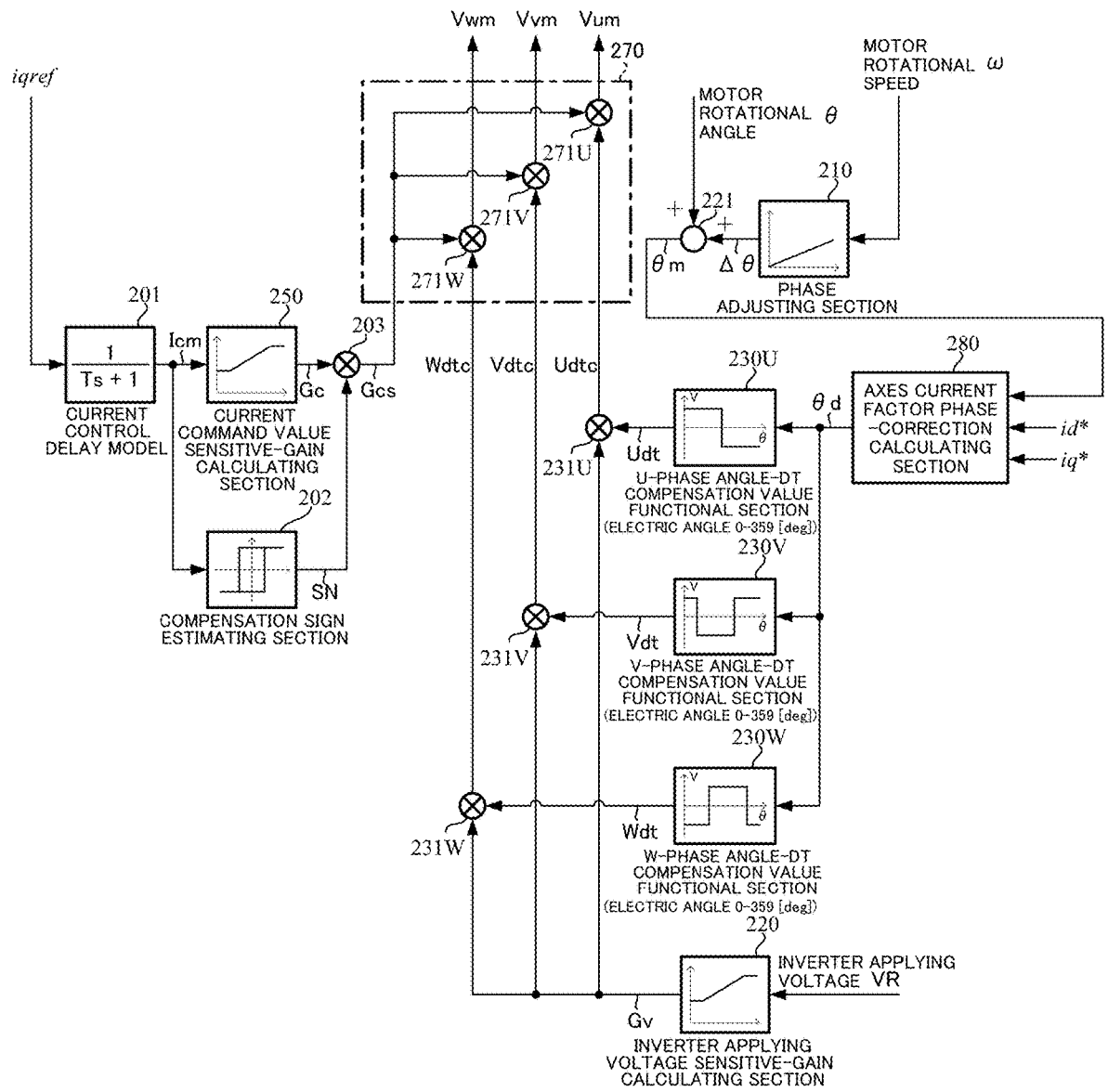
FIG. 44 is a block diagram showing the detail configuration example (the fifth embodiment) of the dead time compensating section according to the present invention.

FIG. 43 shows a configuration example (the fifth embodiment) which adds the phase-correction function to the third embodiment, corresponding to FIG. 28. There is provided the axes current factor phase-correction calculating section 280 to perform the phase-correction function in the dead time compensating section 200D, as well as the fourth embodiment. The detail configuration of the dead time compensating section 200D is shown in FIG. 44. The axes current factor phase-correction calculating section 280 performs the phase-correction function by using the similar configuration of the fourth embodiment and performing the similar operation of the fourth embodiment. The dead time compensation-value outputting section comprises the multiplying section 231U, 231V and 231W.

In the fifth embodiment, since the 3-phase voltage command values are directly compensated in the feed-forward by using the dead time compensation values shown in FIG. 40, the same effects as the fourth embodiment are achieved.

In the above embodiments, the motor control unit which installed in the electric power steering apparatus has been described. The motor control unit according to the present invention can naturally be installed in the electric vehicle, the machine tool and the like.

EXPLANATION OF REFERENCE NUMERALS 1 handle (steering wheel)
2 column shaft (steering shaft, handle shaft)
10 torque sensor
20, 100 motor
30 control unit (ECU)
31 steering assist command value calculating section
35, 120d, 120q PI-control section
36, 160 PWM-control section
37, 161 inverter
130, 240, 261 3-phase AC/dq-axes converting section
200, 200A, 200B, 200C, 200D dead time compensating section
201 current control delay model
202 compensation sign estimating section
210 phase adjusting section
220 inverter applying voltage sensitive-gain calculating section
230U, 230V, 230W angle-dead time compensation value functional section
250 current command value sensitive-gain calculating section
270 compensation value adjusting section
280 axes current factor phase-correction calculating section
284 dq-axes current ratio calculating section
286 variation angle calculating section
300 space vector modulating section
301 2-phase/3-phase converting section
302 third-harmonic superimposition section

The invention claimed is:

1. A vector-control type motor control unit that calculates dq-axes control assist command values, calculates dq-axes current command values from said dq-axes control assist command values, converts said dq-axes current command values into 3-phase duty command values, and drives and controls a 3-phase brushless motor by an inverter of a pulse width modulation (PWM) control, comprising:
a central processing unit (CPU) which comprises:
an axes current factor phase-correction calculating section to calculate a phase-correction rotational angle by phase-correcting a motor rotational angle using said dq-axes current command values;
an angle-dead time compensation value functional section to calculate 3-phase dead time reference compensation values based on said phase-correction rotational angle;
an inverter applying voltage sensitive-gain calculating section to calculate a voltage sensitive gain based on an inverter applying voltage; and
a dead time compensation-value outputting section to output dq-axes dead time compensation values which are obtained by multiplying said 3-phase dead time reference compensation values by said voltage sensitive gain and performing 3-phase/dq-axes conversion to said multiplied results,
wherein a dead time compensation of said inverter is performed by using said dq-axes dead time compensation values and dq-axes voltage command values obtained by processing said dq-axes current command values.

2. The vector-control type motor control unit according to claim 1,
wherein said dead time compensation-value outputting section comprises:
multiplying sections to multiply said 3-phase dead time reference compensation values by said voltage sensitive gain; and
a 3-phase alternating current (AC)/dq-axes converting section to convert 3-phase outputs of said multiplying sections into said dq-axes dead time compensation values.

3. The vector-control type motor control unit according to claim 1, further comprising:
a current command value sensitive-gain calculating section to calculate a current command value sensitive gain which makes a compensation amount of said dq-axes dead time compensation values be variable depending on said control assist command values.

4. The vector-control type motor control unit according to claim 1,
wherein said axes current factor phase-correction calculating section comprises:
a dq-axes current ratio calculating section to calculate a current ratio of said dq-axes current command values; and
a variation angle calculating section to calculate a variation angle based on said current ratio,
wherein said motor rotational angle is phase-corrected by using said variation angle.

5. An electric power steering apparatus that is equipped with the vector-control type motor control unit according to claim 1, and applies an assist torque to a steering system of a vehicle.

6. A vector-control type motor control unit that calculates dq-axes control assist command values, calculates dq-axes current command values from said dq-axes control assist command values, converts said dq-axes current command values into dq-axes voltage command values, converts said dq-axes voltage command values into 3-phase duty command values, and drives and controls a 3-phase brushless motor by an inverter of a pulse width modulation (PWM) control, comprising:
a central processing unit (CPU) which comprises:
a space vector modulating section to obtain 3-phase voltage command values by performing a space vector modulation to said dq-axes voltage command values;

an axes current factor phase-correction calculating section to calculate a phase-correction rotational angle by phase-correcting a motor rotational angle using said dq-axes current command values;
an angle-dead time compensation value functional section to calculate 3-phase dead time reference compensation values based on said phase-correction rotational angle;
an inverter applying voltage sensitive-gain calculating section to calculate a voltage sensitive gain based on an inverter applying voltage;
a dead time compensation-value outputting section to output first 3-phase dead time compensation values obtained by multiplying said 3-phase dead time reference compensation values by said voltage sensitive gain; and
a current command value sensitive-gain calculating section to calculate a current command value sensitive gain which makes a compensation amount of said first 3-phase dead time compensation values be variable depending on said control assist command values,
wherein a dead time compensation of said inverter is performed by calculating second 3-phase dead time compensation values by multiplying said first 3-phase dead time compensation values by said current command value sensitive gain, and adding said second 3-phase dead time compensation values to said 3-phase voltage command values.

7. The vector-control type motor control unit according to claim 6, further comprising:

a current control delay model to input said control assist command values and compensate a current delay;
said current command value sensitive-gain calculating section outputs said current command value sensitive gain based on an output of said current control delay model; and
a multiplying section to multiply said current command value sensitive gain by a sign,
wherein said compensation sign estimating section estimates said sign of an output of said current control delay model.

8. The vector-control type motor control unit according to claim 6,
wherein said axes current factor phase-correction calculating section comprises:
a dq-axes current ratio calculating section to calculate a current ratio of said dq-axes current command values; and
a variation angle calculating section to calculate a variation angle based on said current ratio,
wherein said motor rotational angle is phase-corrected by using said variation angle.

9. An electric power steering apparatus that is equipped with the vector-control type motor control unit according to claim 6, and applies an assist torque to a steering system of a vehicle.

* * * * *